(12) United States Patent
Power, III et al.

(10) Patent No.: US 7,453,166 B2
(45) Date of Patent: Nov. 18, 2008

(54) SYSTEM FOR GENERATING ELECTRICITY FROM FLUID CURRENTS

(75) Inventors: Daniel E. Power, III, Nashville, TN (US); Ned R. Hansen, Hyde Park, UT (US); Dody Bachtar, Layton, UT (US); Alan Schilke, Eden, UT (US)

(73) Assignee: Oceana Energy Company, Washington, DC (US)

( * ) Notice: Subject to any disclaimer, the term of this patent is extended or adjusted under 35 U.S.C. 154(b) by 0 days.

(21) Appl. No.: 11/448,640

(22) Filed: Jun. 6, 2006

(65) Prior Publication Data

US 2007/0278796 A1      Dec. 6, 2007

(51) Int. Cl.
*F03D 5/00* (2006.01)

(52) U.S. Cl. .............. 290/54; 290/55; 290/44; 290/43

(58) Field of Classification Search ............ 290/55, 290/54, 44, 43
See application file for complete search history.

(56) References Cited

U.S. PATENT DOCUMENTS

| | | | |
|---|---|---|---|
| 1,518,022 A * | 12/1924 | Twiford | 416/17 |
| 1,715,291 A | 5/1929 | Hisle | |
| 1,791,731 A * | 2/1931 | Madarasz | 416/4 |
| 1,923,971 A * | 8/1933 | Evans | 290/4 R |
| 1,997,149 A | 4/1935 | Lake | |
| 2,375,286 A | 5/1945 | Creed | |
| 2,650,558 A | 9/1953 | Nizery | |
| 3,379,157 A | 4/1968 | Post | |
| 3,504,988 A * | 4/1970 | Stenner | 416/9 |
| 3,673,974 A | 7/1972 | Harper | |
| 3,730,122 A | 5/1973 | Odum et al. | |
| 3,791,327 A | 2/1974 | Deveney | |
| 3,872,679 A | 3/1975 | Fischer | |
| 3,895,495 A | 7/1975 | Akazaki et al. | |
| 3,912,937 A | 10/1975 | Lesser | |
| 3,943,644 A | 3/1976 | Walz | |
| 3,952,723 A * | 4/1976 | Browning | 126/247 |
| 3,992,125 A | 11/1976 | Schilling | |
| 4,084,529 A | 4/1978 | Katernberg | |
| 4,168,439 A * | 9/1979 | Palma | 290/44 |
| 4,224,527 A | 9/1980 | Thompson | |
| 4,248,044 A | 2/1981 | Woodilla | |

(Continued)

FOREIGN PATENT DOCUMENTS

DE     3332054 A1 *   3/1985

(Continued)

OTHER PUBLICATIONS

Arnie Heller, "A New Approach for Magnetically Levitating Trains—and Rockets," *Science & Technology Review*, Lawrence Livermore National Laboratory, pp. 20-22, Jun. 1996.

(Continued)

*Primary Examiner*—Joseph Waks
(74) *Attorney, Agent, or Firm*—O'Brien Jones, PLLC

(57) ABSTRACT

A system for generating electricity from fluid currents having one or more trolleys that move along a closed-loop track as a result of the interaction of fluid currents on one or more blades attached to each trolley. Electrical energy may be generated by the movement of the one or more trolleys along the track.

67 Claims, 40 Drawing Sheets

U.S. PATENT DOCUMENTS

| | | | |
|---|---|---|---|
| 4,276,851 A | | 7/1981 | Coleman |
| 4,306,157 A | | 12/1981 | Wracsarcht |
| 4,313,059 A | | 1/1982 | Howard |
| 4,335,093 A | | 6/1982 | Salomon |
| 4,335,319 A | | 6/1982 | Mettersheimer, Jr. |
| 4,383,182 A | | 5/1983 | Bowley |
| 4,422,799 A | | 12/1983 | Green et al. |
| 4,472,149 A | | 9/1984 | Ballantine |
| 4,500,259 A | | 2/1985 | Schumacher |
| 4,582,582 A | | 4/1986 | Gibbard |
| 4,756,666 A | | 7/1988 | Labrador |
| 4,832,569 A | * | 5/1989 | Samuelsen et al. ............ 416/17 |
| 4,850,190 A | | 7/1989 | Pitts |
| 5,117,774 A | | 6/1992 | English et al. |
| 5,177,387 A | | 1/1993 | McMichael et al. |
| 5,317,976 A | | 6/1994 | Aruga et al. |
| 5,440,176 A | | 8/1995 | Haining |
| 5,511,488 A | | 4/1996 | Powell et al. |
| 5,592,816 A | | 1/1997 | Williams |
| 5,710,469 A | | 1/1998 | Ries |
| 5,722,326 A | | 3/1998 | Post |
| 5,747,426 A | | 5/1998 | Abboud |
| 5,758,911 A | | 6/1998 | Gerhardt |
| 5,953,996 A | | 9/1999 | Powell et al. |
| 5,992,341 A | * | 11/1999 | Gerhardt ................ 114/102.16 |
| 6,006,518 A | | 12/1999 | Geary |
| 6,100,600 A | | 8/2000 | Pflanz |
| 6,109,863 A | | 8/2000 | Milliken |
| 6,250,230 B1 | | 6/2001 | Post |
| 6,327,994 B1 | | 12/2001 | Labrador |
| 6,357,359 B1 | | 3/2002 | Davey et al. |
| 6,371,697 B2 | | 4/2002 | Huang |
| 6,498,402 B2 | | 12/2002 | Saiz |
| 6,511,261 B2 | | 1/2003 | de Waard |
| 6,551,053 B1 | | 4/2003 | Schuetz |
| 6,629,503 B2 | | 10/2003 | Post |
| 6,629,815 B2 | * | 10/2003 | Lusk ......................... 415/4.2 |
| 6,633,217 B2 | | 10/2003 | Post |
| 6,647,716 B2 | | 11/2003 | Boyd |
| 6,648,589 B2 | | 11/2003 | Williams |
| RE38,336 E | | 12/2003 | Williams |
| 6,664,880 B2 | | 12/2003 | Post |
| 6,729,840 B2 | | 5/2004 | Williams |
| 6,734,576 B2 | | 5/2004 | Pacheco |
| 6,758,146 B2 | | 7/2004 | Post |
| 6,781,253 B2 | | 8/2004 | Newman |
| 6,791,206 B1 | | 9/2004 | Woodbridge |
| 6,806,586 B2 | | 10/2004 | Wobben |
| 6,827,022 B2 | | 12/2004 | Van den Bergh et al. |
| 6,849,963 B2 | | 2/2005 | Grinsted et al. |
| 6,856,036 B2 | | 2/2005 | Belinsky |
| 6,899,036 B2 | | 5/2005 | Lamb et al. |
| 6,918,350 B1 | | 7/2005 | Morse |
| 6,941,883 B2 | | 9/2005 | Nguyen |
| 6,955,049 B2 | | 10/2005 | Krouse |
| 6,982,498 B2 | | 1/2006 | Tharp |
| 6,983,701 B2 | | 1/2006 | Thornton et al. |
| 6,995,479 B2 | | 2/2006 | Tharp |
| 6,998,730 B2 | | 2/2006 | Tharp |
| 7,011,501 B2 | | 3/2006 | Lindberg |
| 7,075,191 B2 | * | 7/2006 | Davison ...................... 290/54 |
| 7,077,072 B2 | | 7/2006 | Wingett et al. |
| 7,096,794 B2 | | 8/2006 | Post |
| 7,146,918 B2 | | 12/2006 | Meller |
| 7,190,087 B2 | | 3/2007 | Williams |
| 7,228,812 B2 | | 6/2007 | Morse |
| 7,298,056 B2 | | 11/2007 | Gizara |
| 2002/0034437 A1 | | 3/2002 | Williams |
| 2002/0158472 A1 | | 10/2002 | Robson |
| 2003/0005851 A1 | | 1/2003 | Post |
| 2003/0112105 A1 | | 6/2003 | Post |
| 2003/0201645 A1 | | 10/2003 | Pacheco |
| 2003/0217668 A1 | | 11/2003 | Fiske et al. |
| 2004/0119358 A1 | | 6/2004 | Thornton et al. |
| 2004/0123766 A1 | | 7/2004 | van den Bergh et al. |
| 2005/0031442 A1 | | 2/2005 | Williams |
| 2005/0204948 A1 | | 9/2005 | Post |
| 2005/0265820 A1 | | 12/2005 | Williams |
| 2005/0269822 A1 | * | 12/2005 | Kinpara et al. ............ 290/40 C |
| 2005/0285404 A1 | | 12/2005 | Tharp |
| 2005/0285405 A1 | | 12/2005 | Tharp |
| 2006/0016365 A1 | | 1/2006 | Baldi et al. |
| 2006/0251510 A1 | | 11/2006 | Gray et al. |
| 2007/0018460 A1 | | 1/2007 | Williams |
| 2007/0063520 A1 | | 3/2007 | Ahmad |
| 2008/0038061 A1 | | 2/2008 | Morse |

FOREIGN PATENT DOCUMENTS

| | | | | |
|---|---|---|---|---|
| DE | 4033078 A1 | * | 4/1992 | |
| DE | 197 57 121 A1 | | 7/1999 | |
| EP | 1 650 432 A1 | | 4/2006 | |
| FR | 2297333 A1 | * | 8/1976 | |
| GB | 2 018 687 A | | 10/1979 | |
| GB | 2 142 596 A | | 1/1985 | |
| JP | 56-057590 A | | 5/1981 | |
| JP | 58-122287 A | | 7/1983 | |
| JP | 59-206284 A | | 11/1984 | |
| JP | 62-131895 A | | 6/1987 | |
| JP | 62-131896 A | | 6/1987 | |
| JP | 62-184995 A | | 8/1987 | |
| JP | 5-221382 A | | 8/1993 | |
| JP | 5-238475 A | | 9/1993 | |
| JP | 6-99888 A | | 4/1994 | |
| JP | 2005348582 A | * | 12/2005 | |
| RU | 2197640 C2 | * | 1/2003 | |
| RU | 2247861 C1 | * | 3/2005 | |
| WO | WO 00/45050 | | 6/2000 | |
| WO | WO 02/02934 A1 | | 1/2002 | |
| WO | WO 2005/028857 A1 | | 3/2005 | |
| WO | WO 2005080789 A1 | | 9/2005 | |

OTHER PUBLICATIONS

English Translation of RU 2 197 640 C2 to Bolotov et al, published Jan. 27, 2003 (3 pages).

English Translation of RU 2 247 861 C1 to Grokhovskly, published Mar. 10, 2005.

International Search Report (mail date of Feb. 1, 2008) from Corresponding International Application No. PCT/US2007/013554 (4 pages).

Written Opinion of the International Searching Authority (mail date of Feb. 1, 2008) from Corresponding International Application No. PCT/US2007/013554 (5 pages).

English language Abstract of JP 56-057590 A.
English language Abstract of JP 58-122287 A.
English language Abstract of JP 59-206284 A.
English language Abstract of JP 62-131895 A.
English language Abstract of JP 62-131896 A.
English language Abstract of JP 62-184995 A.
Engliah language Abstract of JP 5-221382 A.
English language Abstract of JP 5-238475 A.
English language Abstract of JP 6-99888 A.

* cited by examiner

SYSTEM FOR GENERATING ELECTRICITY FROM FLUID CURRENTS

BACKGROUND OF THE INVENTION

1. Field of the Invention

This invention relates to a system for generating electrical energy from fluid currents, especially currents in water.

2. Description of the Related Art

There are a variety of patents on different devices for generating electricity from ocean currents. These include the following: U.S. Pat. Nos. 4,313,059; 4,335,319; 4,383,182; 4,500,259; 4,850,190; 6,006,518; 6,109,863; 6,734,576; 6,781,253; 6,849,963; 6,856,036; 6,955,049; and 6,998,730.

Although intended to convert wind energy, the device of U.S. Pat. No. 4,756,666 employs sails attached to an "aerial cable railway." Similarly, U.S. Pat. No. 6,498,402 discloses parachutes connected to a continuous cable for converting wind energy to electrical energy. And U.S. Pat. No. 3,992,125 utilizes blades moving within a housing underwater in order to generate electrical power.

Furthermore, there are at least nine other patents and five patent applications dealing with the production of electricity from water currents. The patents are U.S. Pat. Nos. 3,912,937; 4,224,527; 4,306,157; 5,440,176; 6,647,716; 6,806,586; 6,982,498; 6,995,479; and 7,011,501. The applications are contained in United States patent publication nos. 2002/0034437; 2002/0158472; 2003/0201645; 2005/0285404; and 2005/0285405.

Finally, there are four patents and one patent application dealing with a hydroelectric turbine blade having no central shaft. These are U.S. Pat. Nos. 5,592,816; RE38,336; 6,648,589; and 6,729,840. The patent application is U.S. patent application Ser. No. 10/633,865, which has been published as United States patent application publication no. 2005/0031442. In the Hydroelectric Turbine of the patent application, magnets are used as bearings to maintain the alignment of the rotor blade. To generate electricity this Hydroelectric Turbine has " . . . magnets imbedded in the periphery of its blade and cores imbedded in its housing." Thus, the blade serves as a rotor of an electrical generator; and the housing functions as the stator of such a generator. Consequently, though, the outer diameter of the blade must be less than the inner diameter of the stator.

Additionally, two patents, although not dealing with the production of electricity from ocean currents, do disclose underwater tracked systems. U.S. Pat. No. 3,943,644 describes a dredge which utilizes "a flexible combined guide train and conveying train assembly" to move buckets containing scraped sediments to a boat. And U.S. Pat. No. 4,422,799 discloses the use of a marine railway system to install submarine pipelines.

None of the preceding patents or applications, however, employ trolleys that are propelled by blades along a track to which the trolleys are mounted either through wheels or by magnetic levitation.

With regard simply to the general concept of magnetic levitation there are also a number of United States patents and patent publications.

The patents include U.S. Pat. Nos. 5,511,488; 5,953,996; 6,357,359; 6,633,217; 6,664,880; and 6,899,036.

Exemplary patent publications are United States patent publication nos. 2003/0005851; 2003/0112105; 2003/0217668; 2004/0119358; 2004/0123766; 2005/0204948; and 2006/0016365.

Furthermore, a team at Lawrence Livermore National Laboratory headed by physicist Richard Post has disclosed an Inductrack concept, which is a technology for magnetic levitation.

"Inductrack involves two main components: a special array of permanent, room-temperature magnets mounted on the vehicle and a track embedded with close-packed coils of insulated copper wire. The permanent magnets are arranged in configurations called Halbach arrays, named after Klaus Halbach, retired Lawrence Berkeley National Laboratory physicist . . . ."

The inventors did not locate a patent for the original Inductrack, itself; but the following United States patents appear to be variations of the basic concept: U.S. Pat. Nos. 6,629,503; 6,758,146; 6,827,022; and 6,983,701.

Still, the inventors are unaware of any patent or product which utilizes magnetic induction in a device to produce electricity from fluid currents.

Magnetic bearings are the subject of the following exemplary patents: U.S. Pat. Nos. 5,177,387; 5,710,469; and 5,747,426.

Again, however, the use of magnetic bearings in a device to produce electricity from fluid currents is unknown to the inventors.

BRIEF SUMMARY OF THE INVENTION

The System for Generating Electricity from Fluid Currents of the present invention employs one or more trolleys that are mounted, either through wheels or through magnetic levitation and magnetic bearings, to a closed-loop track.

Spacing between trolleys can be controlled with a computer, sensors, and brakes. Preferably, however, either a rigid beam is connected between adjacent trolleys or the trolleys are connected to a continuous annular structure having the same shape as the track. (Herein the term "spacing ring" shall be used as a generic term to cover both (a) such rigid beams connected between adjacent trolleys and (b) the continuous annular structure. With only one trolley in the System, the latter portion of the definition would, of course, be applicable.)

For propulsion, one or more blades are attached to each trolley. Optionally, one or more blades may also be attached to the spacing ring. The orientation of the blades with respect to the trolley or the spacing ring may be either fixed or adjustable. Current in the fluid within which the System is placed acts on the blades through any method that is known in the art for propelling a blade or sail. The fluid is preferably, but not necessarily water.

Generation of electricity is preferably the result of relative motion between magnets associated with (i.e., attached to or imbedded—partially or completely—within) the trolley; the spacing ring; or, preferably, a ring designated the electrical ring, which is separate from the spacing ring (but still connected to the trolleys) and a conductor physically connected to the track in such a location that the conductor is at least sometimes within the magnetic field of the magnets associated with the trolley, the spacing ring, or the electrical ring. Alternatively, the locations of the conductor and the magnets can be reversed with one another.

If the track has a circular path, the spacing ring and the electrical ring merely need be circular. Should the track have a non-circular path, the spacing ring and the electrical ring must each be hinged. In no embodiment, however, is the outer diameter of the blade limited by the inner diameter of the stator (the annular unit).

DETAILED DESCRIPTION OF THE INVENTION

Figure 1:
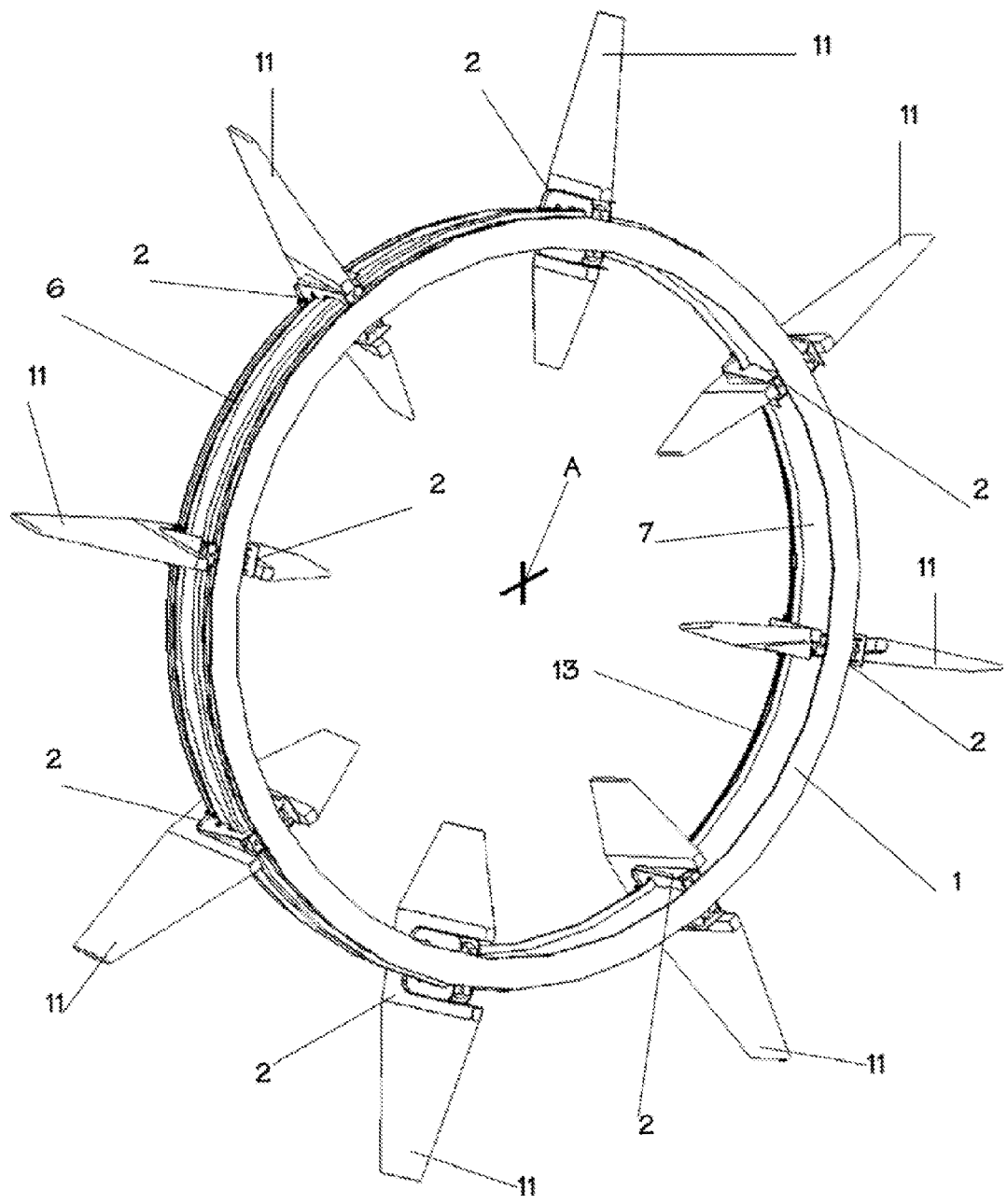
FIG. 1 presents a perspective view of a preferred embodiment of the overall System for Generating Electricity from Fluid Currents.

A system for generating electricity from fluid currents in accordance with an exemplary embodiment of the present invention, an overall view of which is provided in FIG. 1, comprises a closed-loop track 1, one or more trolleys 2 having a blade 11 attached to each of such trolleys 2 and with such trolleys 2 moving along the track 1, a means for supporting each trolley 2 along the track 1, a means for keeping a desired spacing of the trolleys 2, and a means for converting the motion of each trolley 1 into electrical energy.

The track 1 may be comprised of a single rail 3 or multiple rails 3. The cross section of a rail 3 may be any open or closed shape but is preferably rectangular or circular.

Wheels 4, any well-known magnetic levitation technology 5, or a combination of both wheels 4 and magnetic levitation technology 5 constitute the means for supporting and guiding each trolley 2 along the track 1, Herein the term "magnetic levitation technology" includes both magnetic bearings and traditional magnetic levitation. Movement of each trolley 2 along the track causes each trolley 2 to rotate substantially in a plane and generally about an axis A of the track 1.

Figure 2:
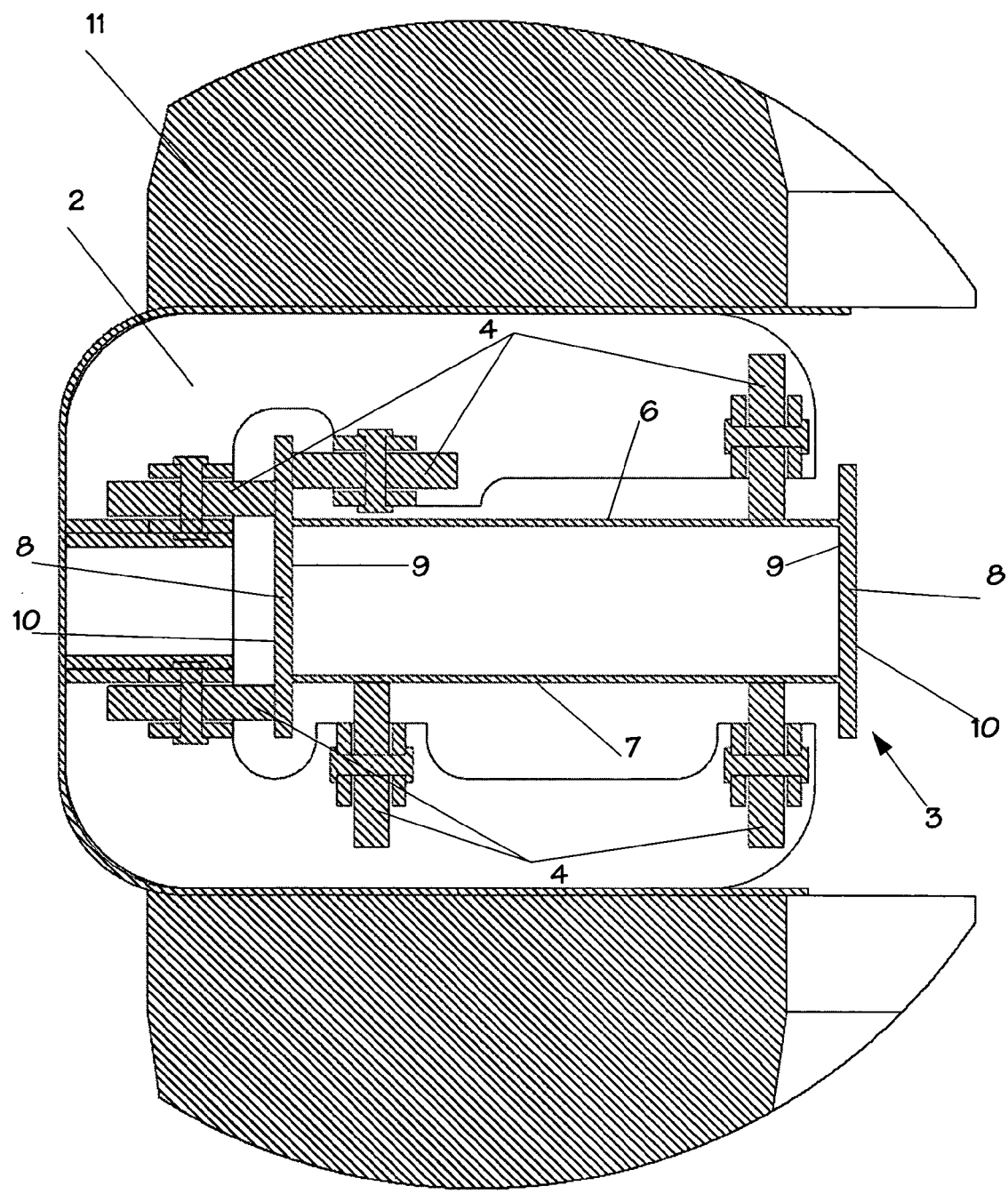
FIG. 2 depicts, in an embodiment employing wheels, the relationship of such wheels to an embodiment of the track having a rectangular cross section.

FIG. 2 depicts, in an embodiment employing wheels 4, the relationship of such wheels to an embodiment of the track 1 consisting of a single rail 3 having a rectangular cross section. The track 1 preferably has a top 6, a bottom 7, and projecting edges 8 having a first side 9 as well as a second side 10; and, preferably, wheels 4 on each trolley 2 are simultaneously in contact with both the top 6 and bottom 7 of the track 1 as well as both sides 9, 10 of one of the projecting edges 8 of the track 1.

Figure 3:
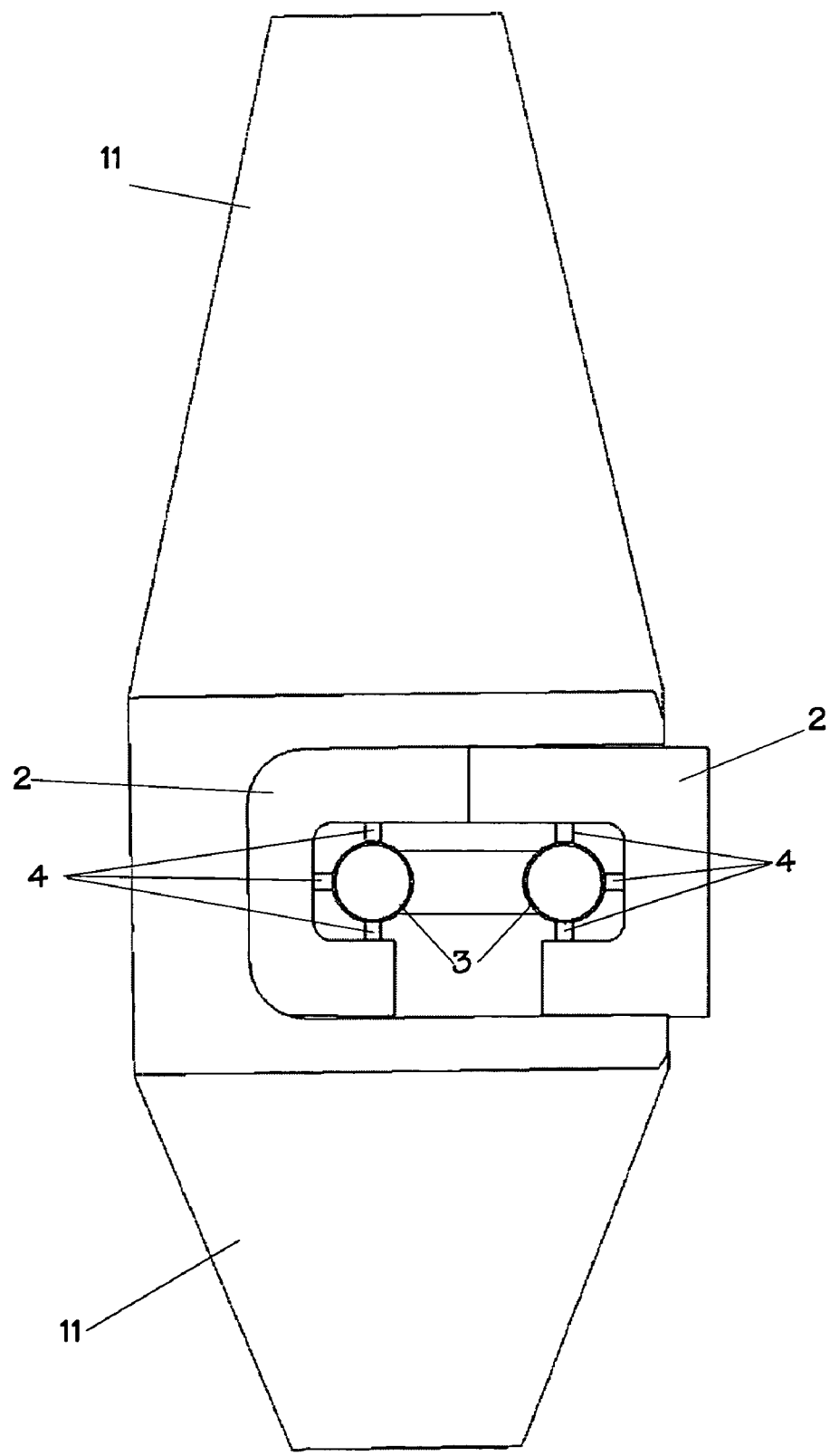
FIG. 3 illustrates, in an embodiment employing wheels, the relationship of such wheels to an embodiment of the track having two rails with a circular cross section.

FIG. 3 illustrates, in an embodiment employing wheels 4, the relationship of such wheels 4 to an embodiment of the track 1 having two rails 3 with a circular cross section.

Figure 4:
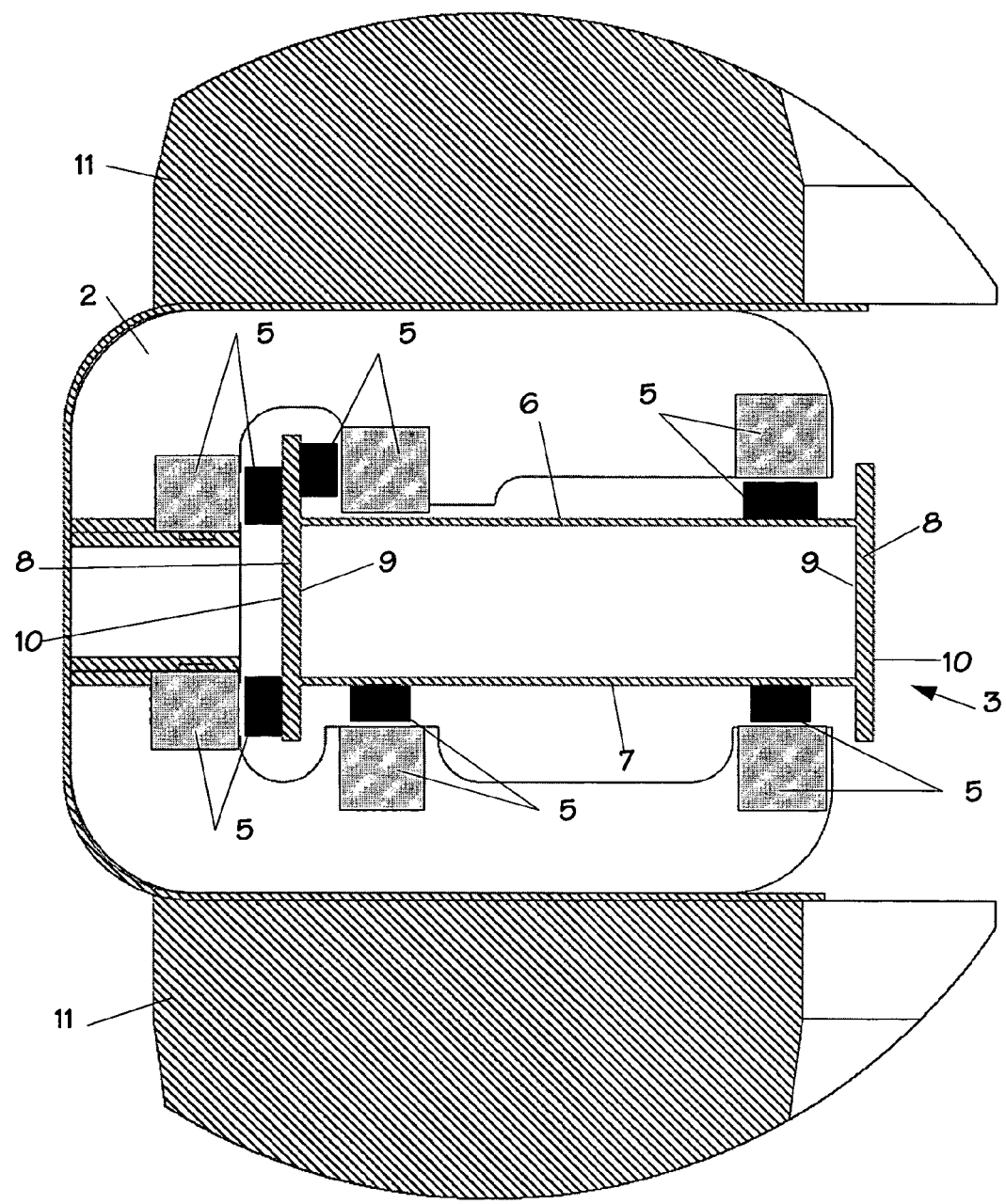
FIG. 4 depicts the embodiment of FIG. 2 utilizing magnetic levitation technology in lieu of all wheels.
Figure 5:
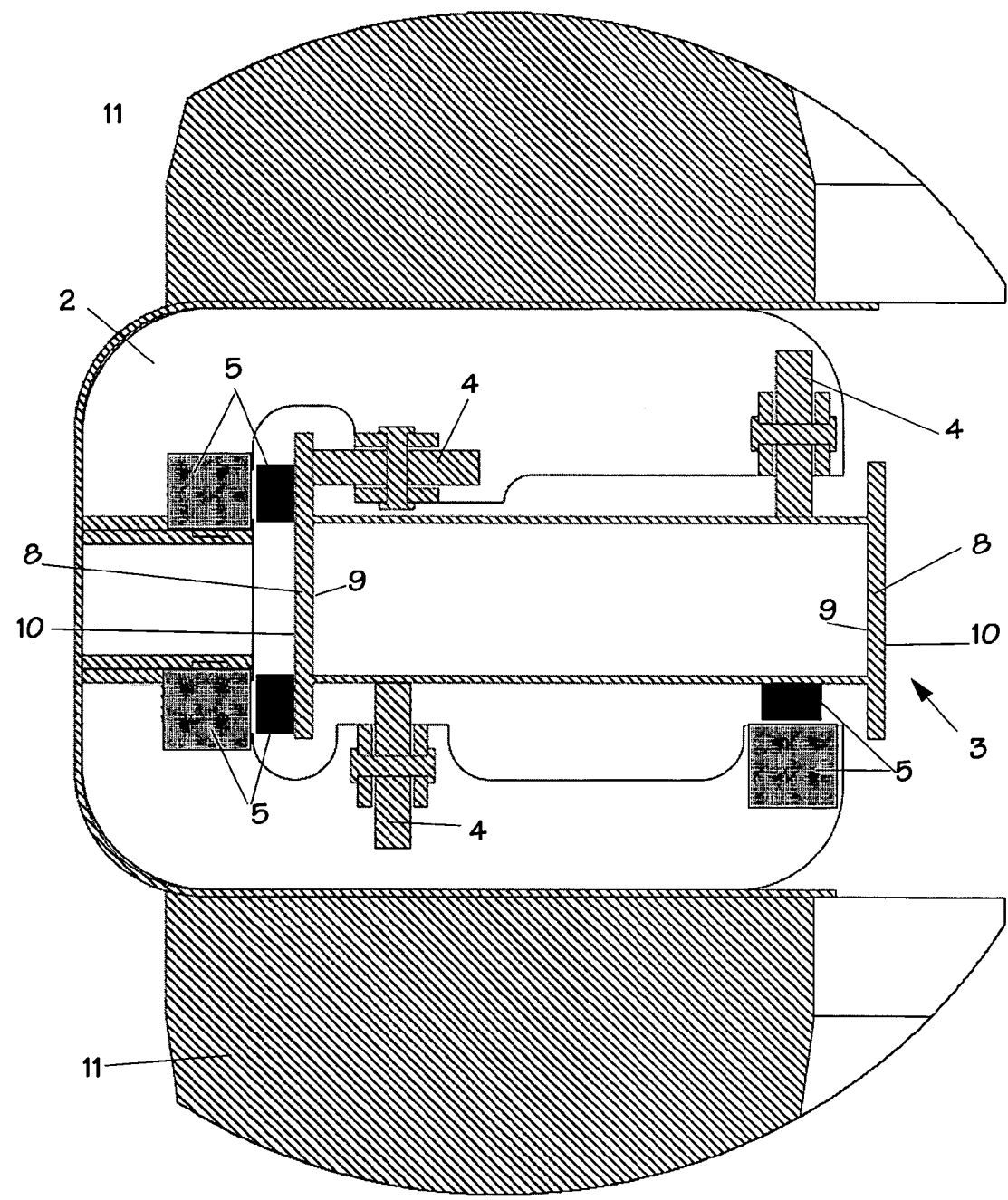
FIG. 5 shows the embodiment of FIG. 2 utilizing magnetic levitation technology in lieu of some wheels.

FIG. 4 depicts the embodiment of FIG. 2 utilizing magnetic levitation technology 5 in lieu of wheels 4. And FIG. 5 shows the embodiment of FIG. 2 utilizing magnetic levitation technology 5 in lieu of only some wheels 4.

Figure 6:
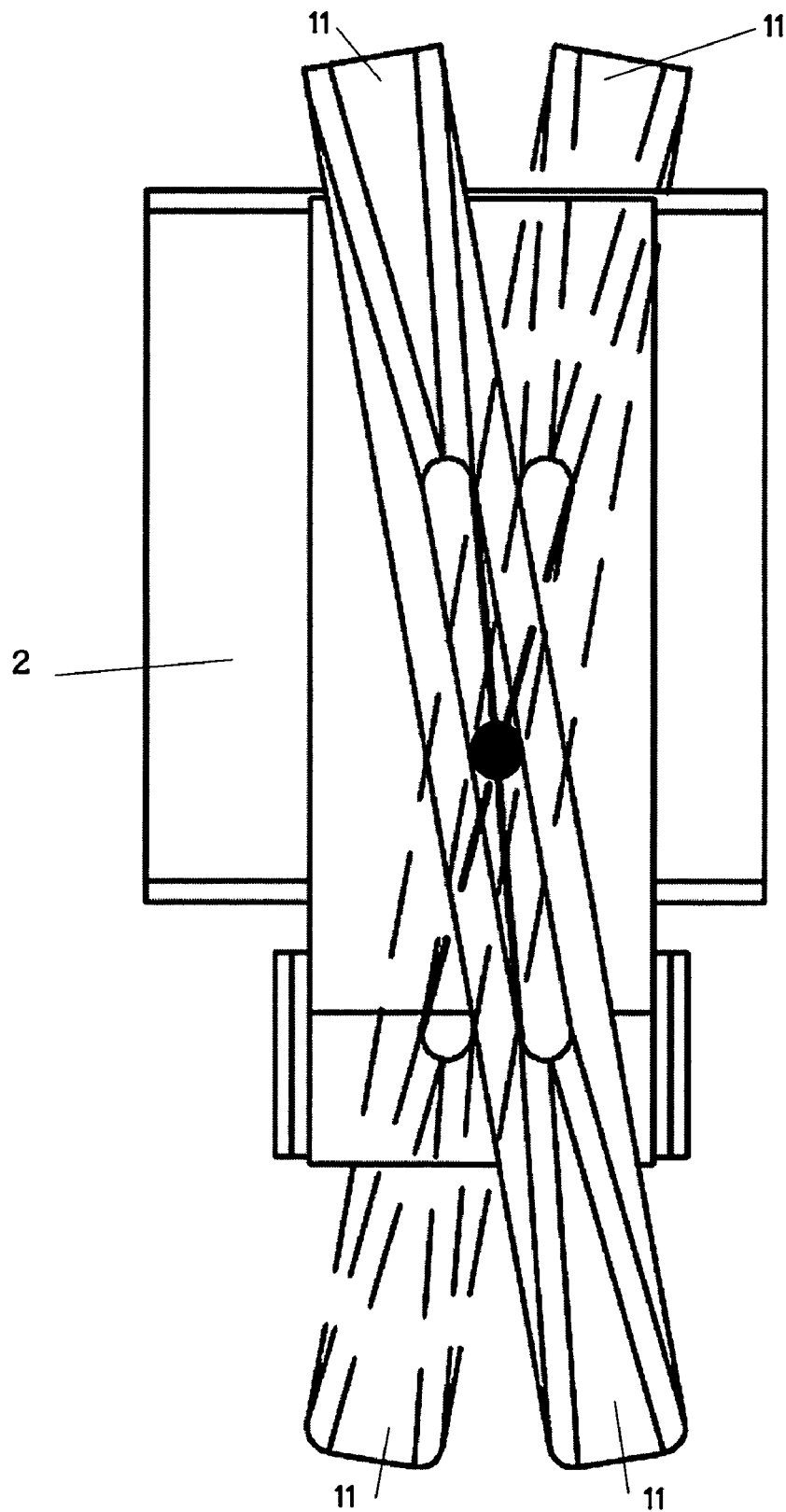
FIG. 6 is a plan view showing a blade the position of which can be adjusted relative to the trolley to which the blade is attached.
Figure 7:
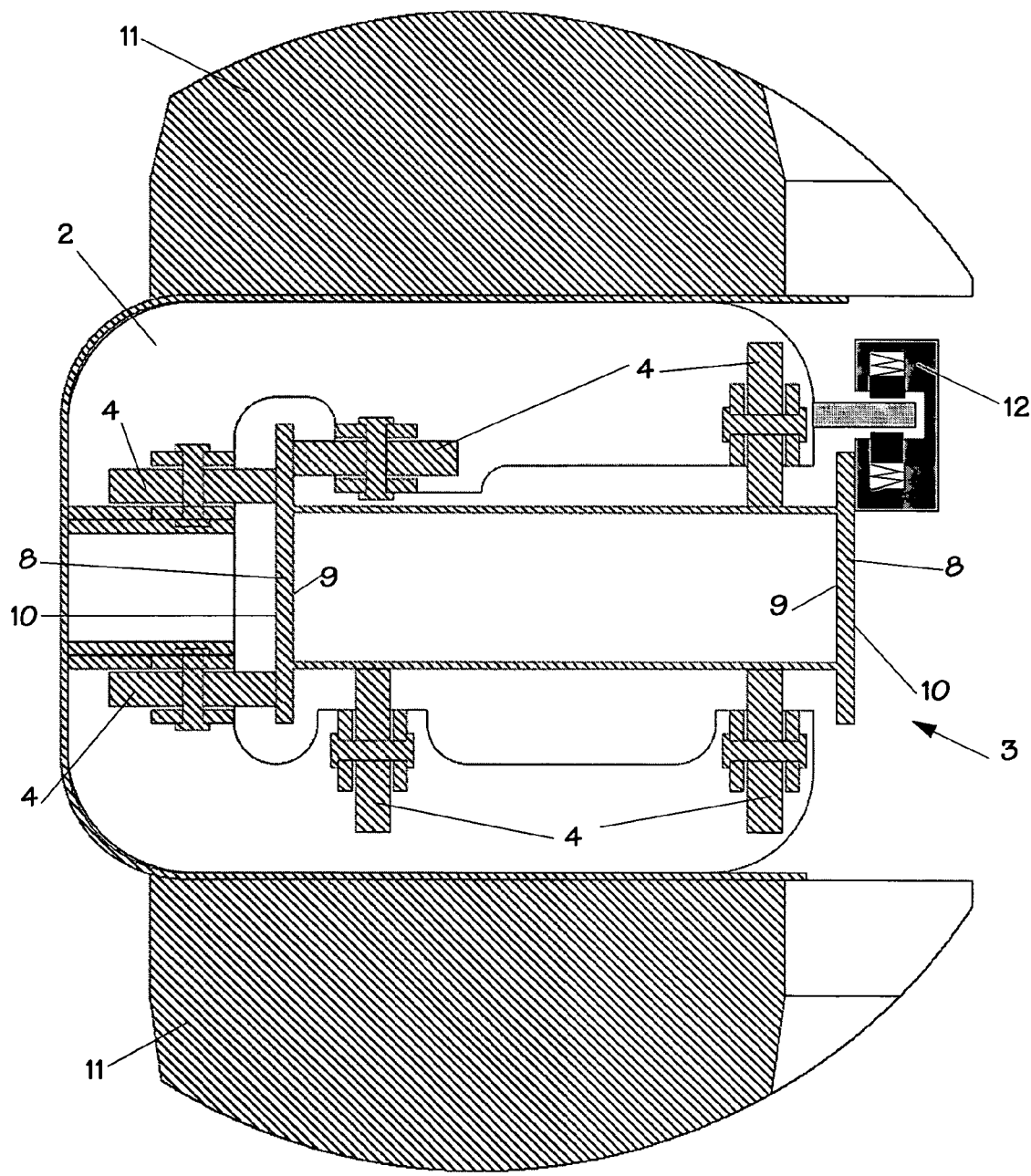
FIG. 7 illustrates the embodiment of FIG. 3 with the addition of a brake.
Figure 8:
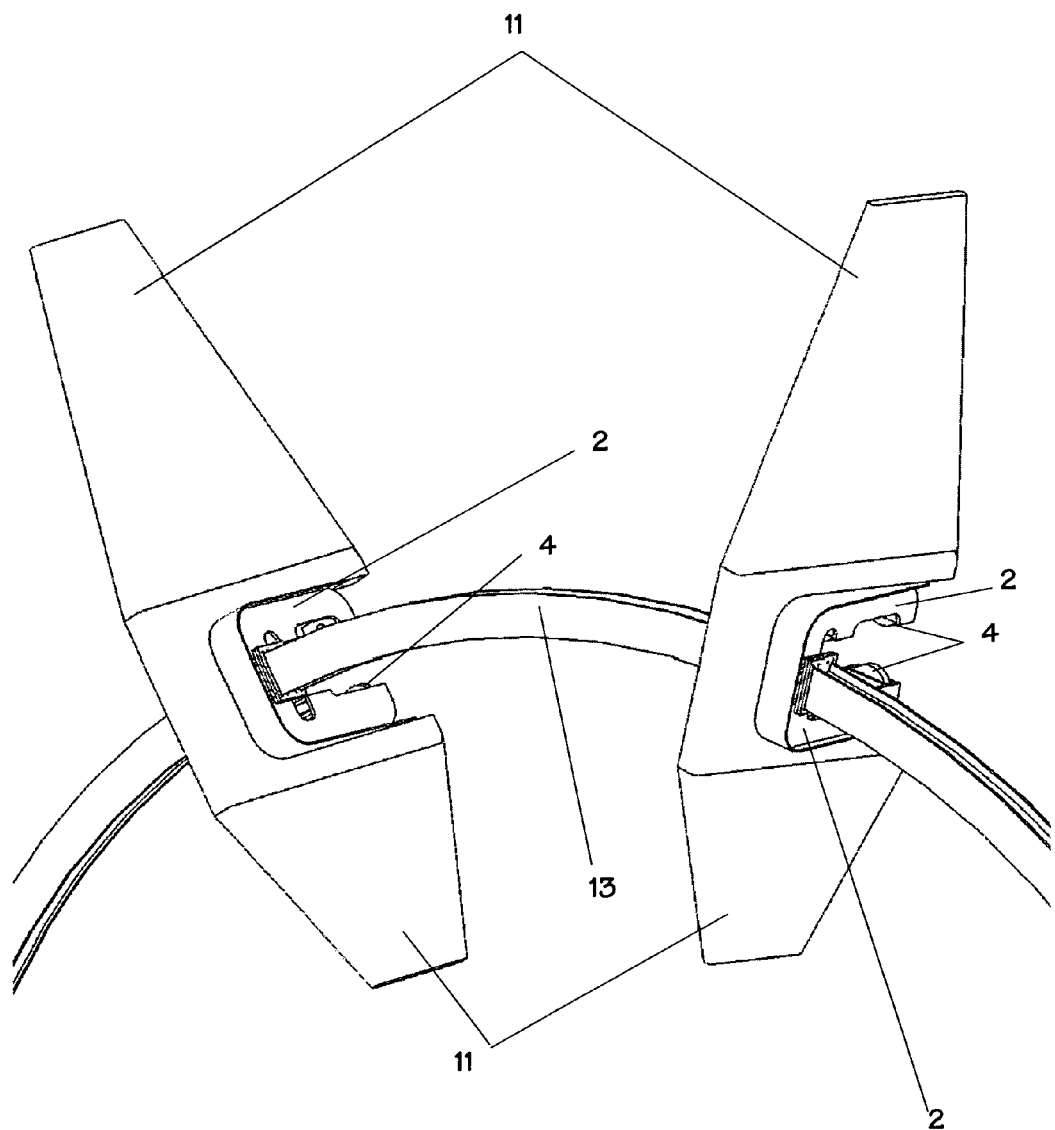
FIG. 8 shows an exemplary embodiment of a rigid connecting beam between adjacent trolleys.
Figure 9:
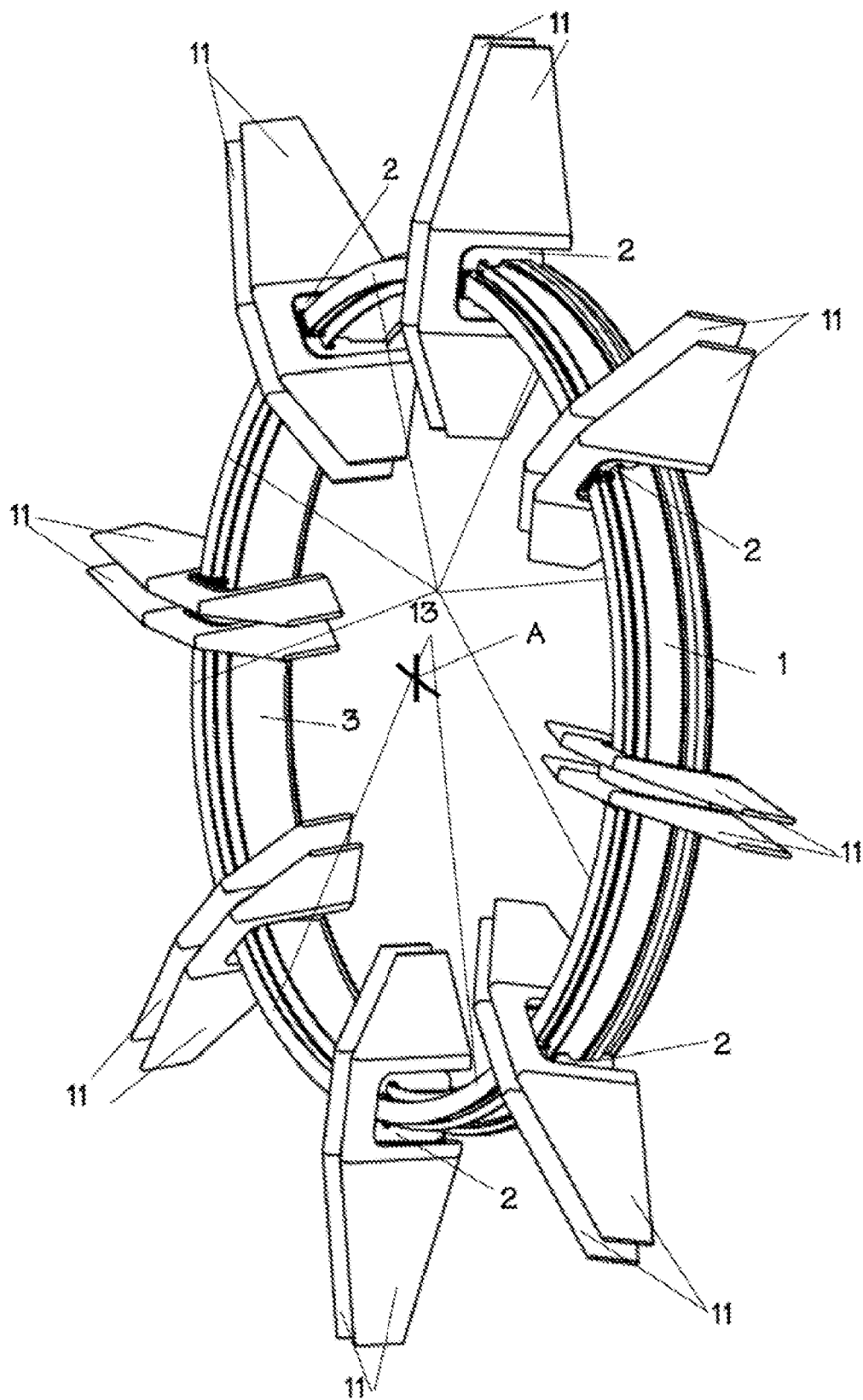
FIG. 9 shows multiple blades attached to each trolley.

The means for keeping a desired spacing can be any computerized system (not illustrated) known in the art of electrical generation or roller coasters, preferably involving a feedback process and utilizing any sensor known in the art of roller coasters together with either adjustment, as portrayed in FIG. 6, of one or more blades 11, which are—as discussed in the next paragragph—utilized for propulsion or the application of any type of brake 12 known in the art of roller coasters and illustrated in FIG. 7. Preferably, however, either a rigid beam 13 is connected between adjacent trolleys 2, as illustrated in FIG. 8, or the trolleys 2 are connected to a continuous annular structure having the same shape as the track 1. (Herein the term "spacing ring" shall be used as a generic term to cover both (a) such rigid beams 13 connected between adjacent trolleys 2 and (b) the continuous annular structure. With only one trolley 2 in the System, the latter portion of the definition would, of course, be applicable.)

Figure 10:
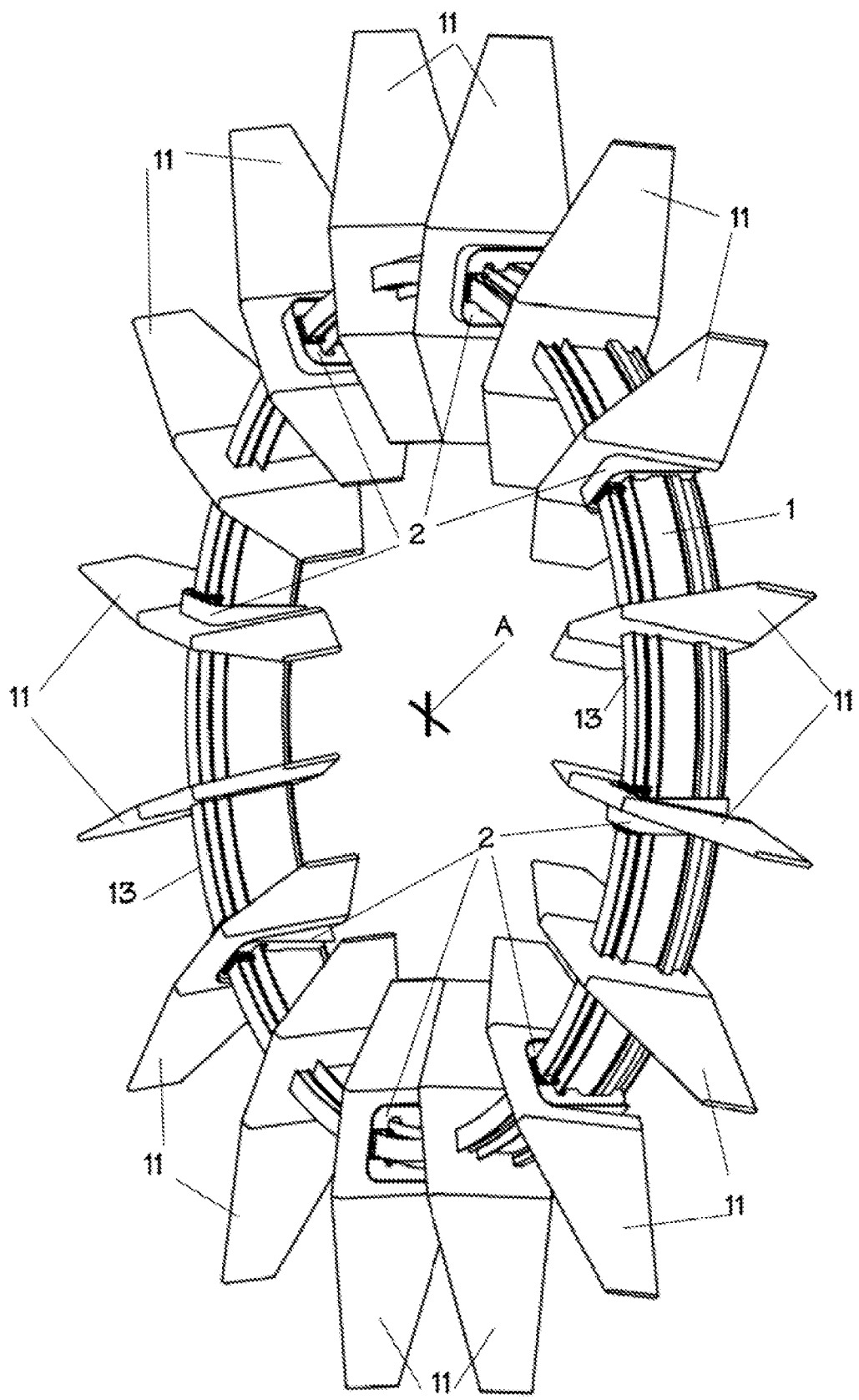
FIG. 10 portrays a blade connected to the spacing ring to which trolleys are attached between each pair of adjacent trolleys.

For propulsion, one or more blades 11 are, as shown in FIGS. 1, 3, 8 and 9, attached to each trolley 2. Optionally, one or more blades 11 may, as depicted in FIG. 10, also be attached to the spacing ring 13. The blades 11 may extend substantially radially relative to the track. For example, blades 11 may extend radially outward and/or radially inward relative to the track. The orientation of the blades 11 with respect to the trolley 2 or the spacing ring 13 may be either fixed or adjustable. In the case of an adjustable blade 11, portrayed in FIG. 6, adjustment may occur mechanically when the trolley 2 is stopped or by computer or other remote control, using any technology that is well known in the art, at any time. Current in the fluid within which the system is placed acts on the blades 11 through any method that is known in the art for propelling a blade 11 or sail. For example, fluid currents moving in a direction approximately parallel to an axis A of the track 1 about which the trolleys 2 rotate as they move along the track 1 interact with the blades 11 to move the trolleys 2 alone the track 1. In other words, movement of the trolleys 2 along the track 1 may occur via interaction of the blades 11 with fluid currents moving in a direction approximately perpendicular to a plane substantially containing the track 1. The fluid is preferably, but not necessarily water.

Figure 11:
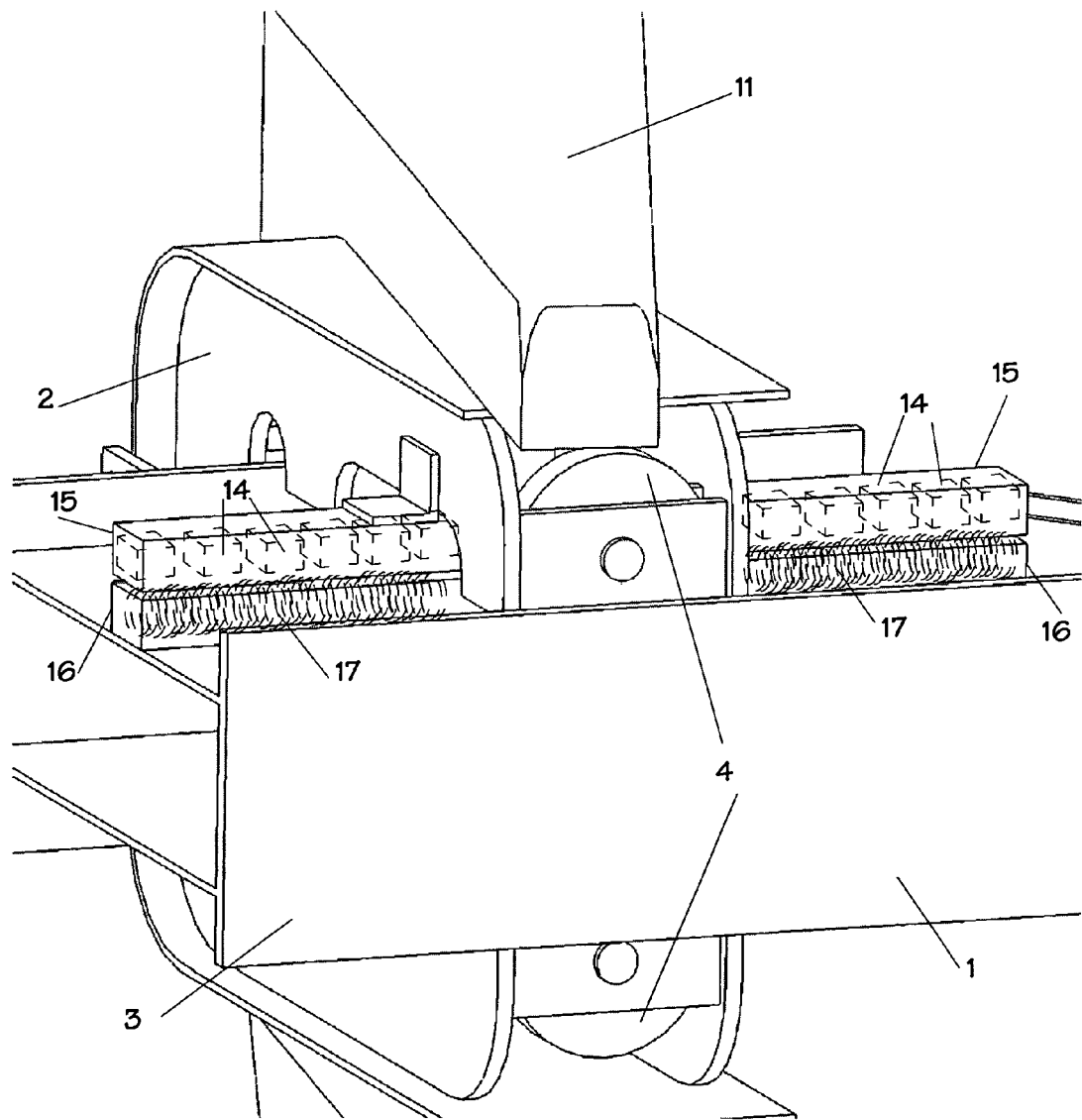
FIG. 11 depicts coils imbedded within the annular unit and magnets imbedded within the electrical ring.
Figure 12:
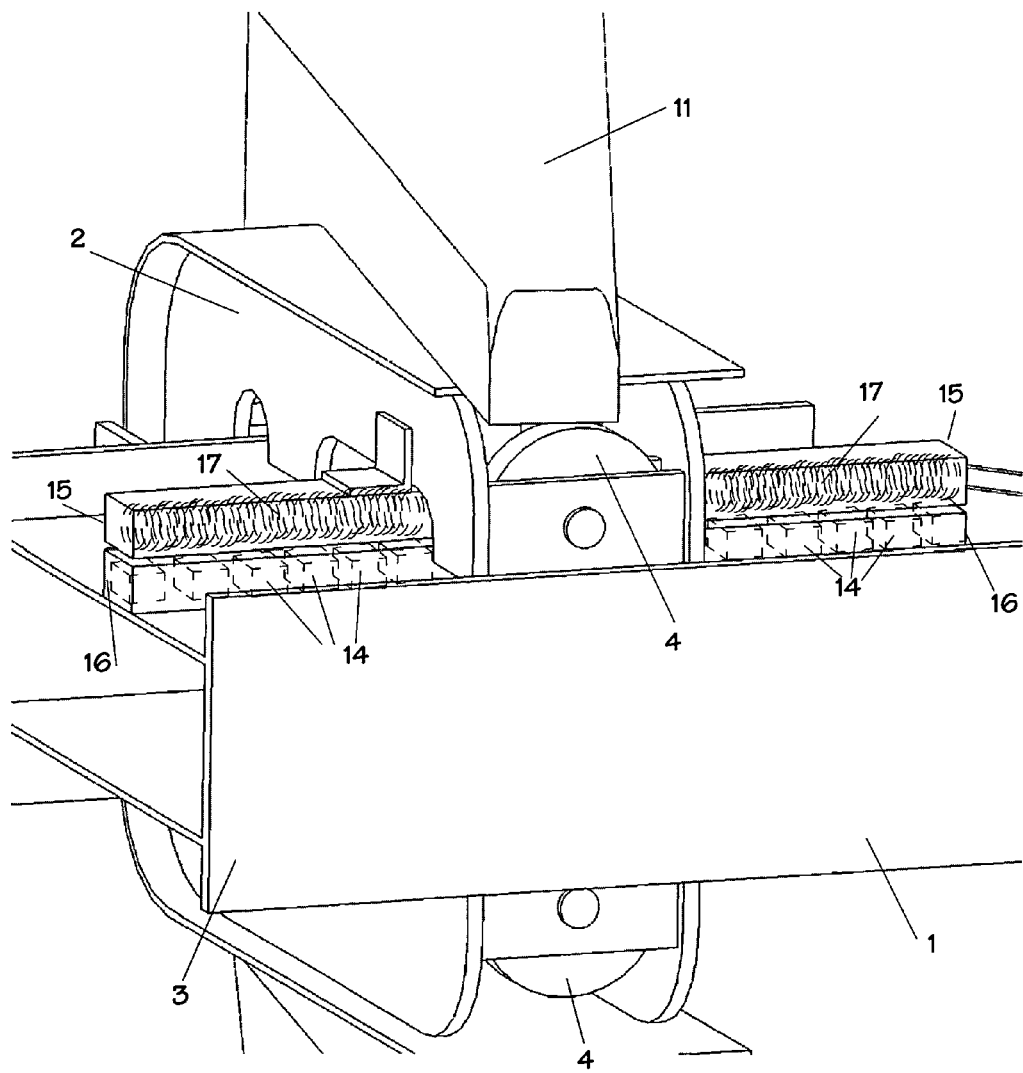
FIG. 12 shows magnets imbedded within the annular unit and coils imbedded within the electrical ring.

Generation of electricity is preferably the result of relative motion between magnets 14 associated with (i.e., attached to or imbedded—partially or completely—within) the trolley 2; the spacing ring 13; or, preferably, a ring (or portion of a ring) designated the electrical ring 15 (with such designation comprising both a complete ring and a portion of a ring), which is separate from the spacing ring 13 (but still connected to the trolleys 2) and a conductor 16 physically connected to the track, as shown in FIG. 11, in such a location that the conductor 16 is at least sometimes within the magnetic field of the magnets 14 associated with the trolley 2, the spacing ring 13, or the electrical ring 15. (The conductor 16 can be an annular conductive unit or one or more coils 17 or linear conductive members attached to or imbedded—partially or completely—within an annular non-conductive unit. Herein the term "annular" denotes any linear shape having no end as well as any segment of such a linear shape.) Alternatively, the locations of the conductor 16 and the magnets 14 can be reversed with one another, as illustrated in FIG. 12. (If an electrical ring 15 or annular unit is so short that it will not interfere with the movement of a trolley 2 along the track 1, such electrical ring 15 or annular unit need not be a portion of a complete ring or a portion of the annular unit; in such a case, the electrical ring 15 or annular unit could even be straight.)

Figure 13:
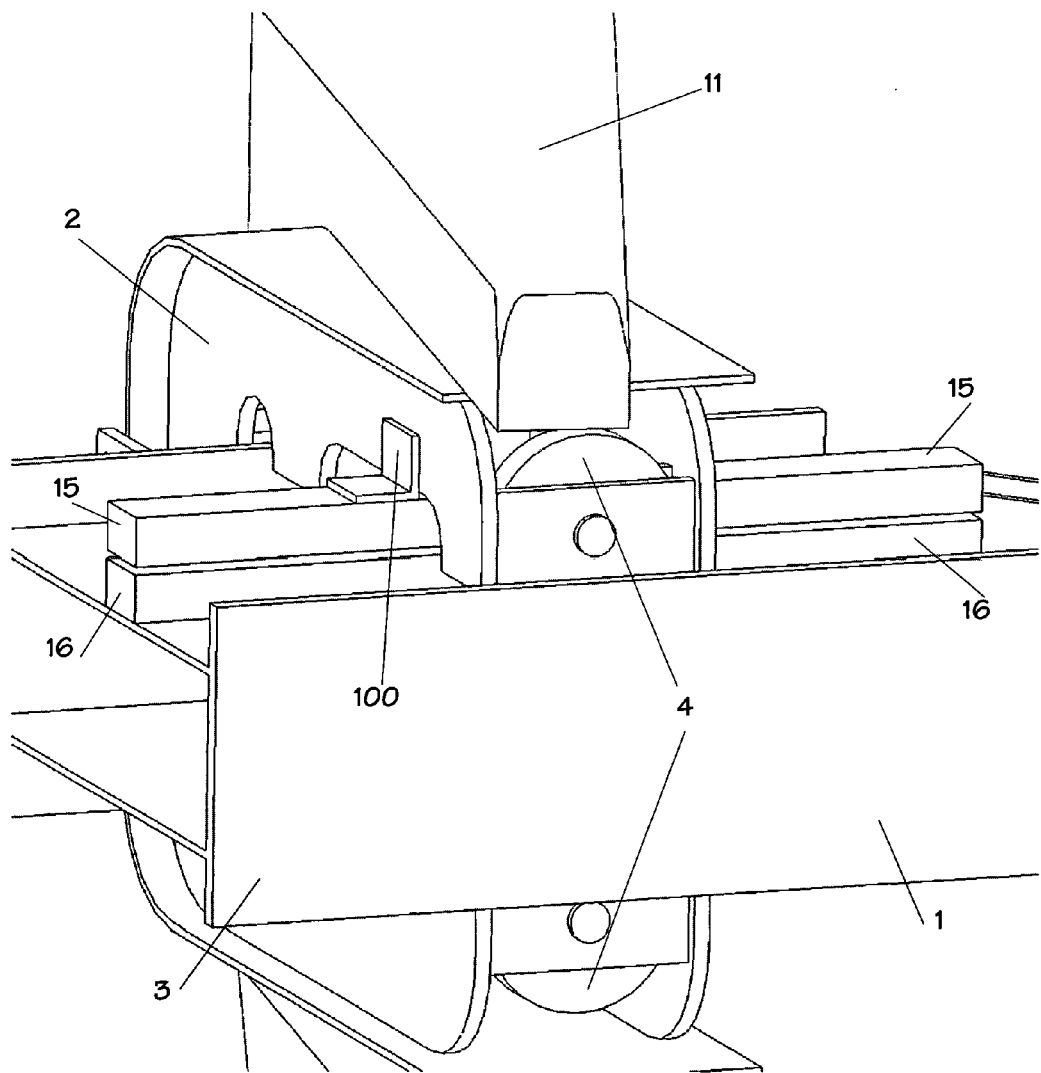
FIG. 13 shows a trolley rigidly connected to an electrical ring that is near an annular unit.
Figure 14:
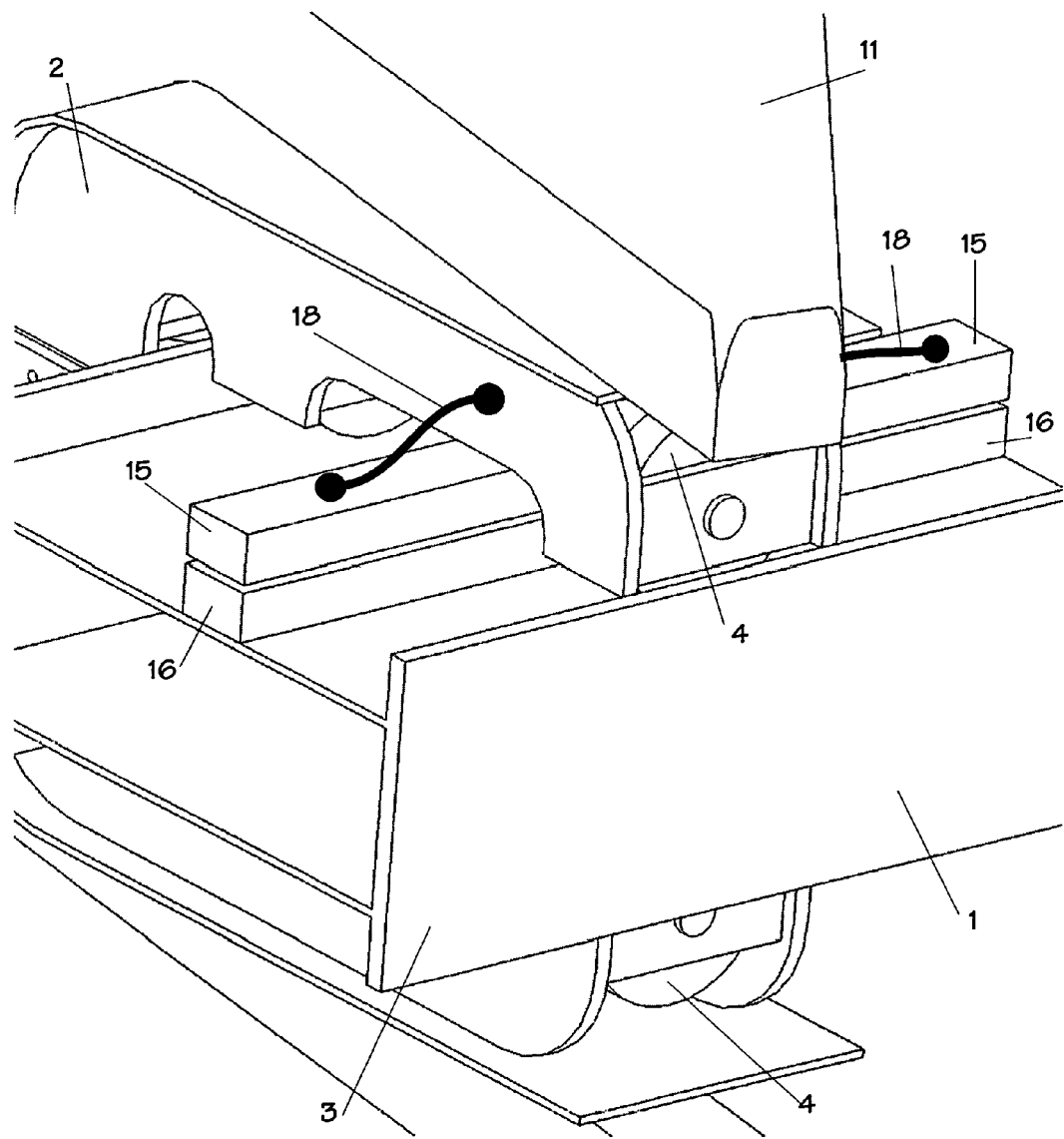
FIG. 14 portrays a trolley connected with one or more cables to an electrical ring that is near an annular unit.
Figure 15:
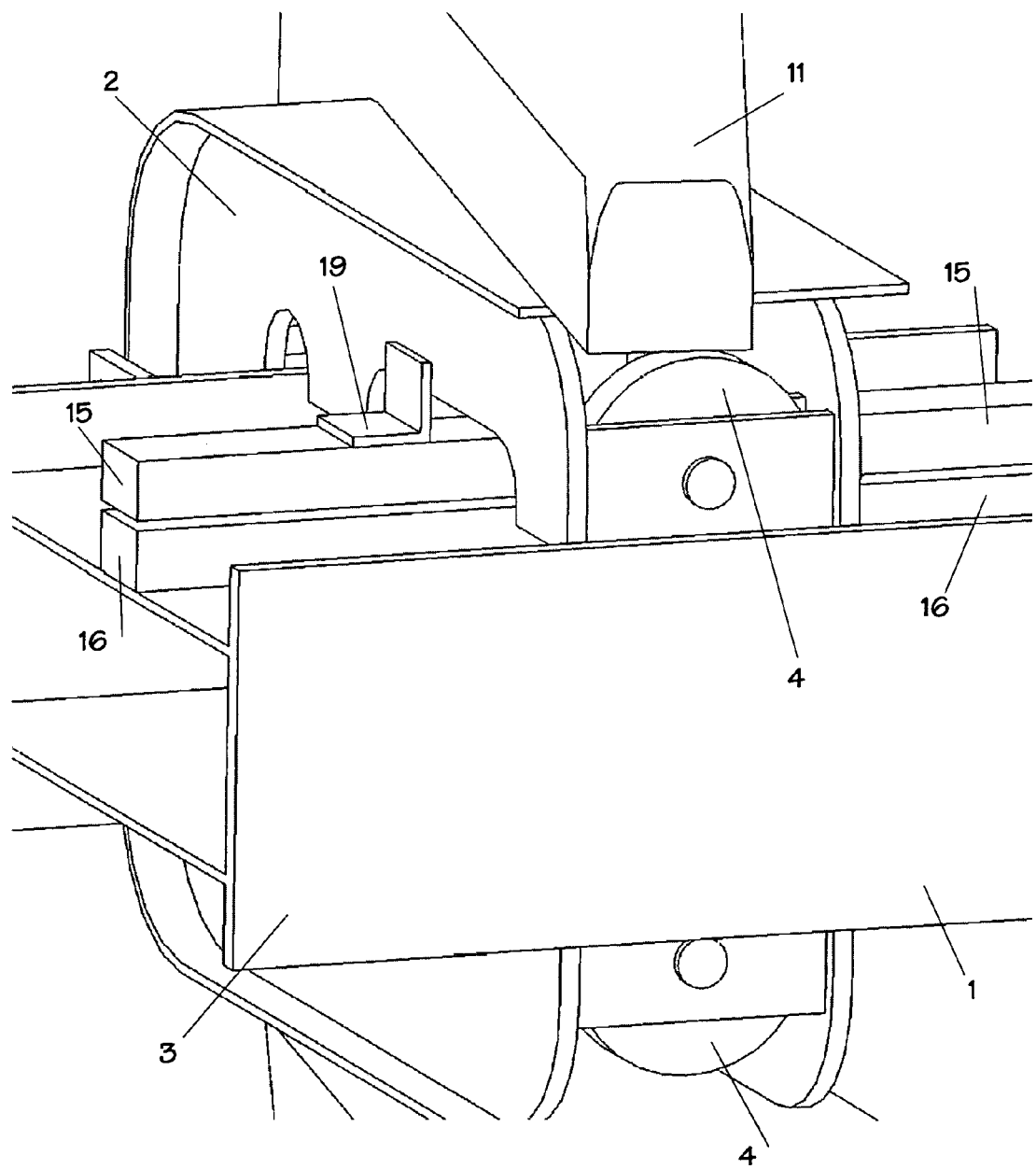
FIG. 15 depicts a trolley that pushes against, but is not connected to, a stop attached to an electrical ring that is near an annular unit.
Figure 16:
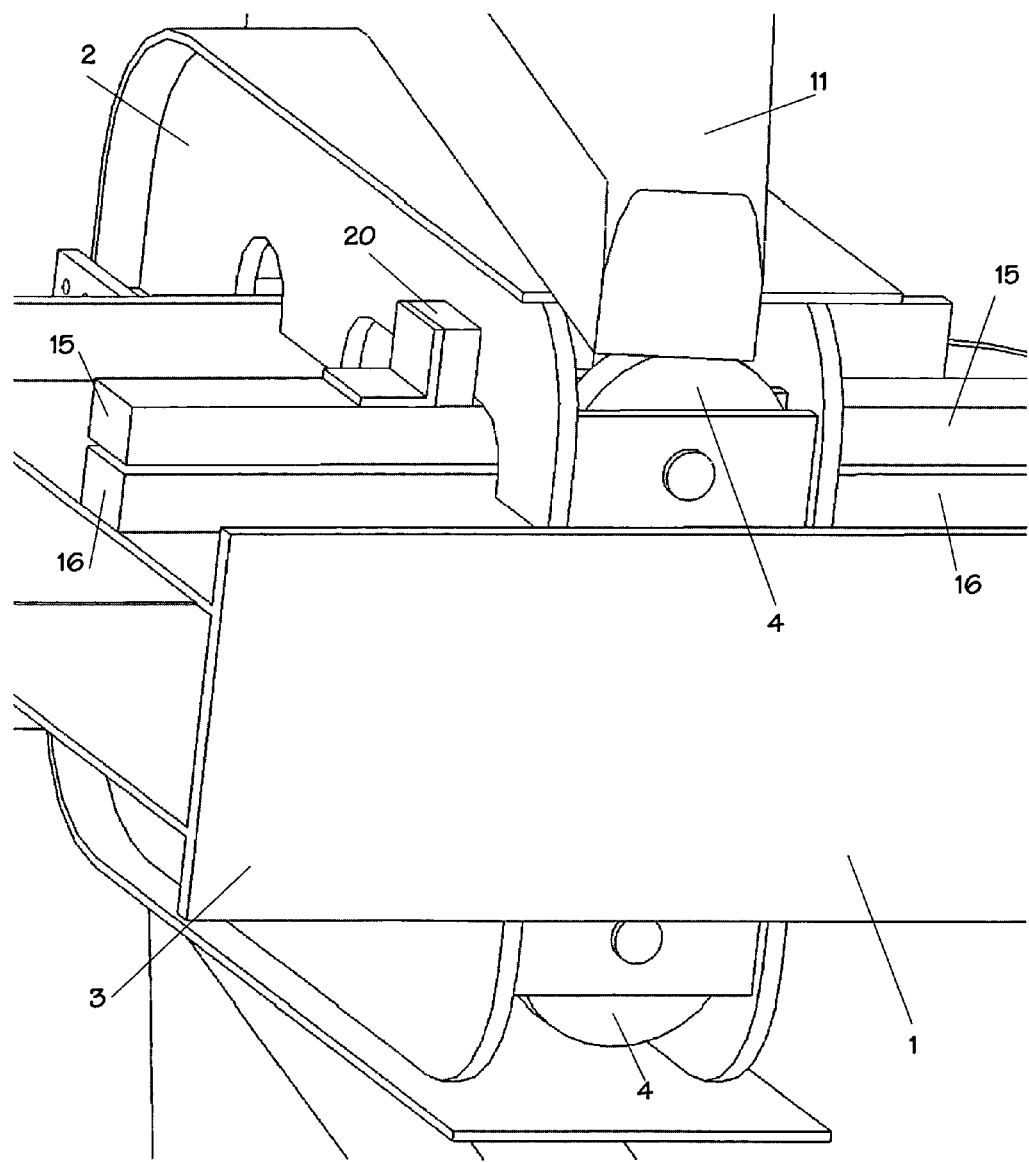
FIG. 16 illustrates a magnet connecting a trolley to an electrical ring that is near an annular unit.
Figure 17:
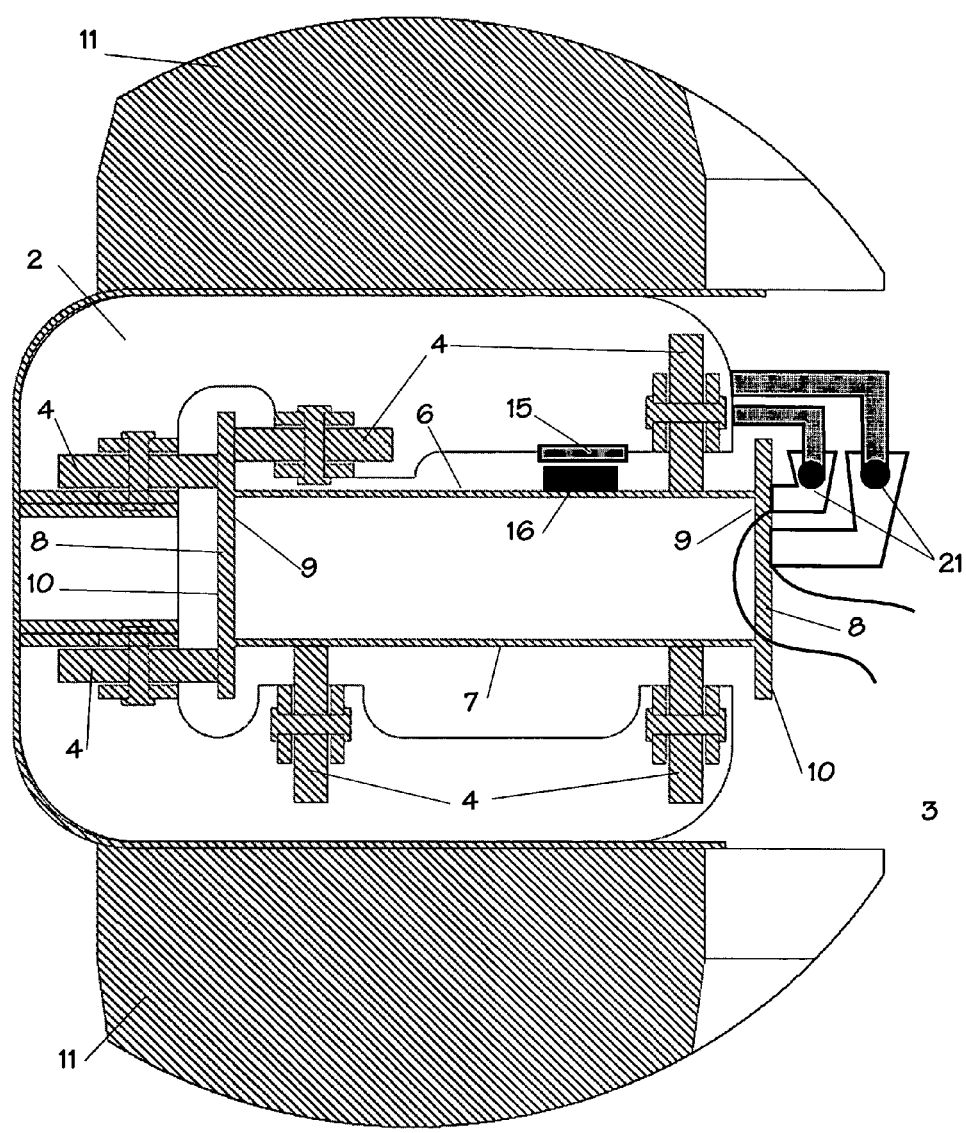
FIG. 17 portrays the embodiment of FIG. 2 when the conductor is comprised of all or a portion of the ring so that sliding electrical connectors are necessary to transfer the electricity that is generated.

The connection of the electrical ring 15 to the trolleys 2 can be rigid, as depicted in FIG. 13, utilizing, e.g., a welded or bolted bracket 100; the connection can be flexible, as shown in FIG. 14 using, e.g., at least one cable 18 or piston; each trolley 2 can, as illustrated in FIG. 15, push against at least one stop 19 rigidly attached to the electrical ring 15; or the connection can, as portrayed in FIG. 16, employ one or more magnets 20. And when the conductor 16 is comprised of all or a portion of the electrical ring 15, specialized electrical connectors such as the sliding electrical connectors 21 portrayed in FIG. 17 are necessary to transfer the electricity that is generated.

Figure 18:
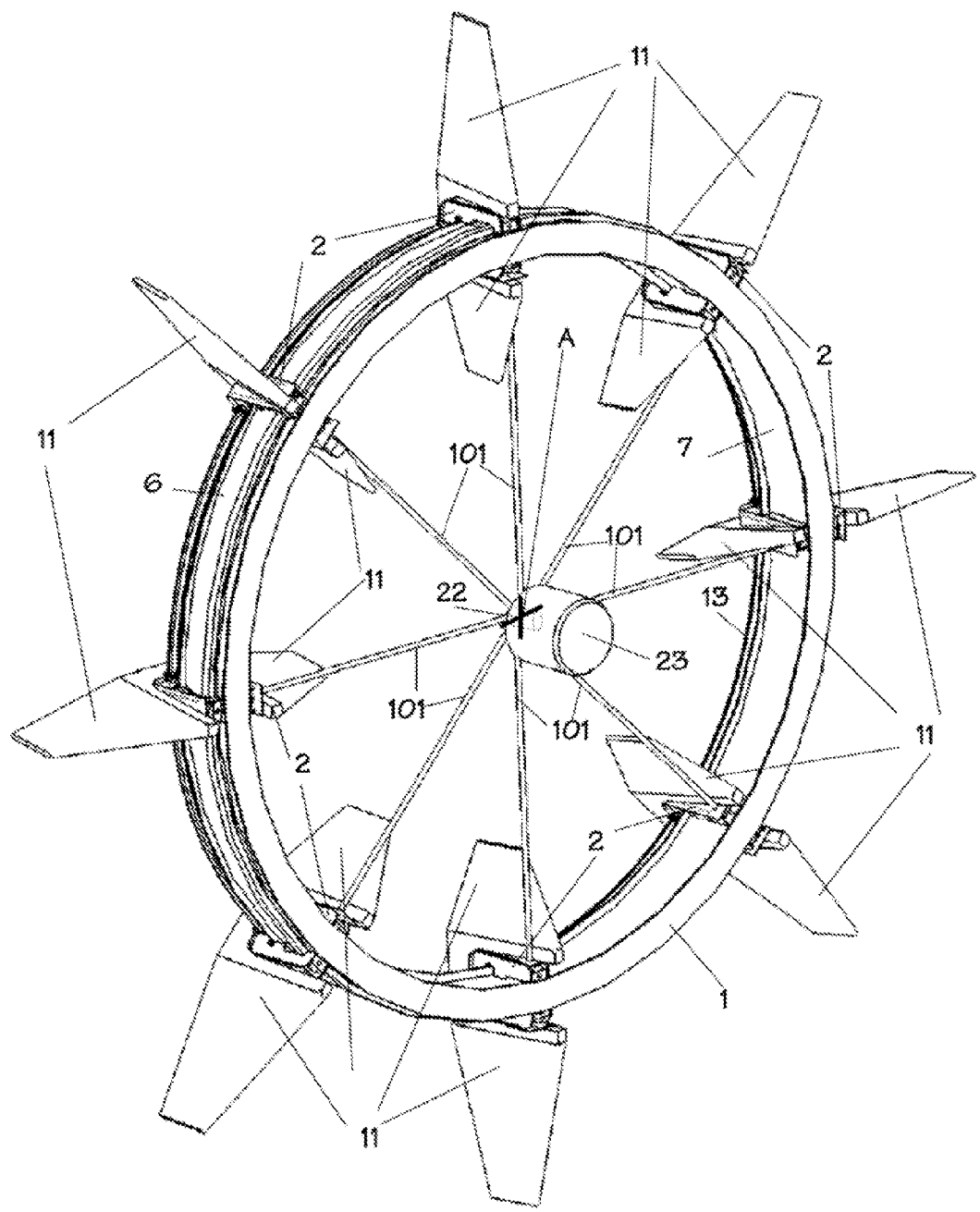
FIG. 18 is a perspective view of the overall System wherein a shaft-operated generator is employed.
Figure 19:
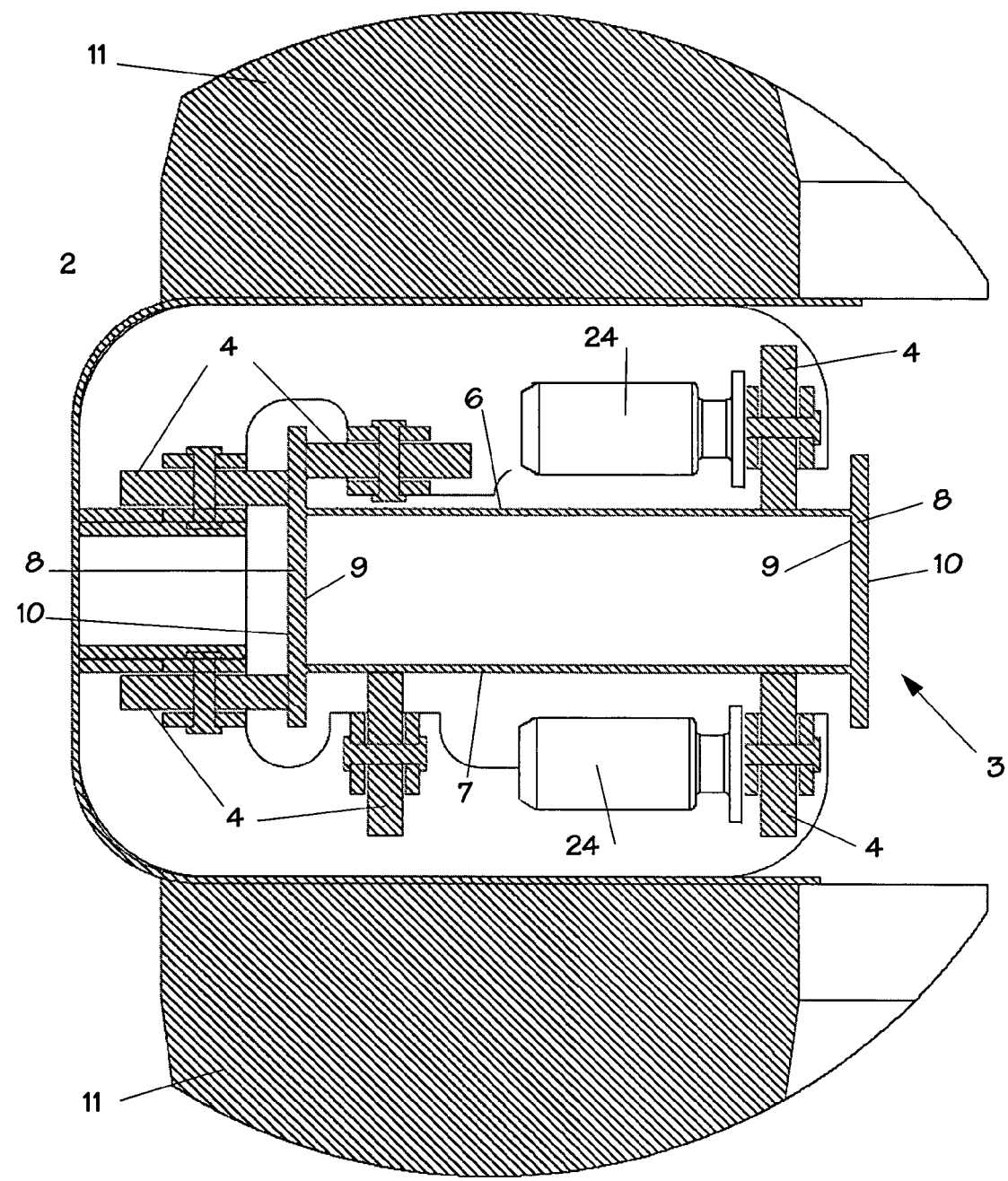
FIG. 19 depicts traditional small electrical generators attached to some of the wheels in order to create electricity from the rotation of such wheels.
Figure 20:
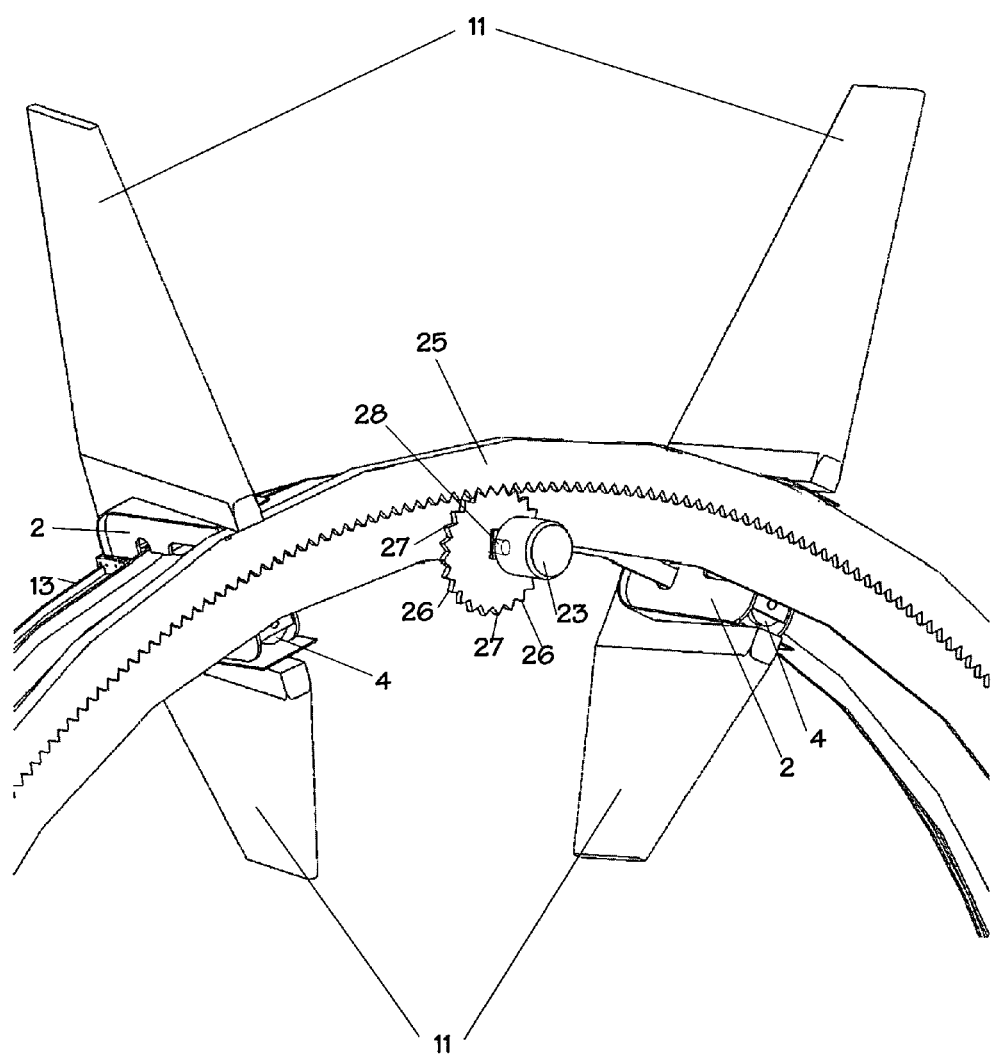
FIG. 20 illustrates a toothed ring attached to each trolley with such toothed ring driving one or more generators.
Figure 21:
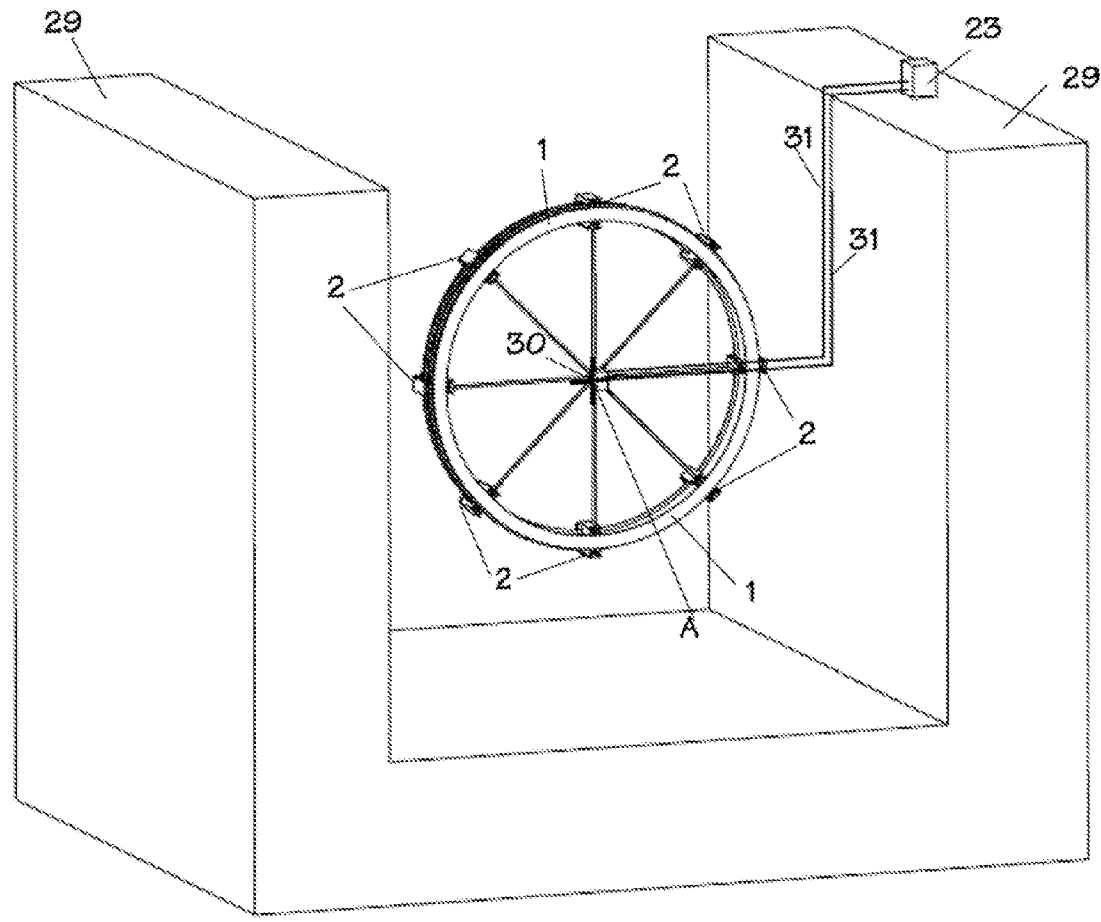
FIG. 21 portrays, located within a canal, the embodiment of FIG. 18 with the generator replaced by a hydraulic pump that sends pressurized fluid through a line to drive a remote generator.
Figure 22:
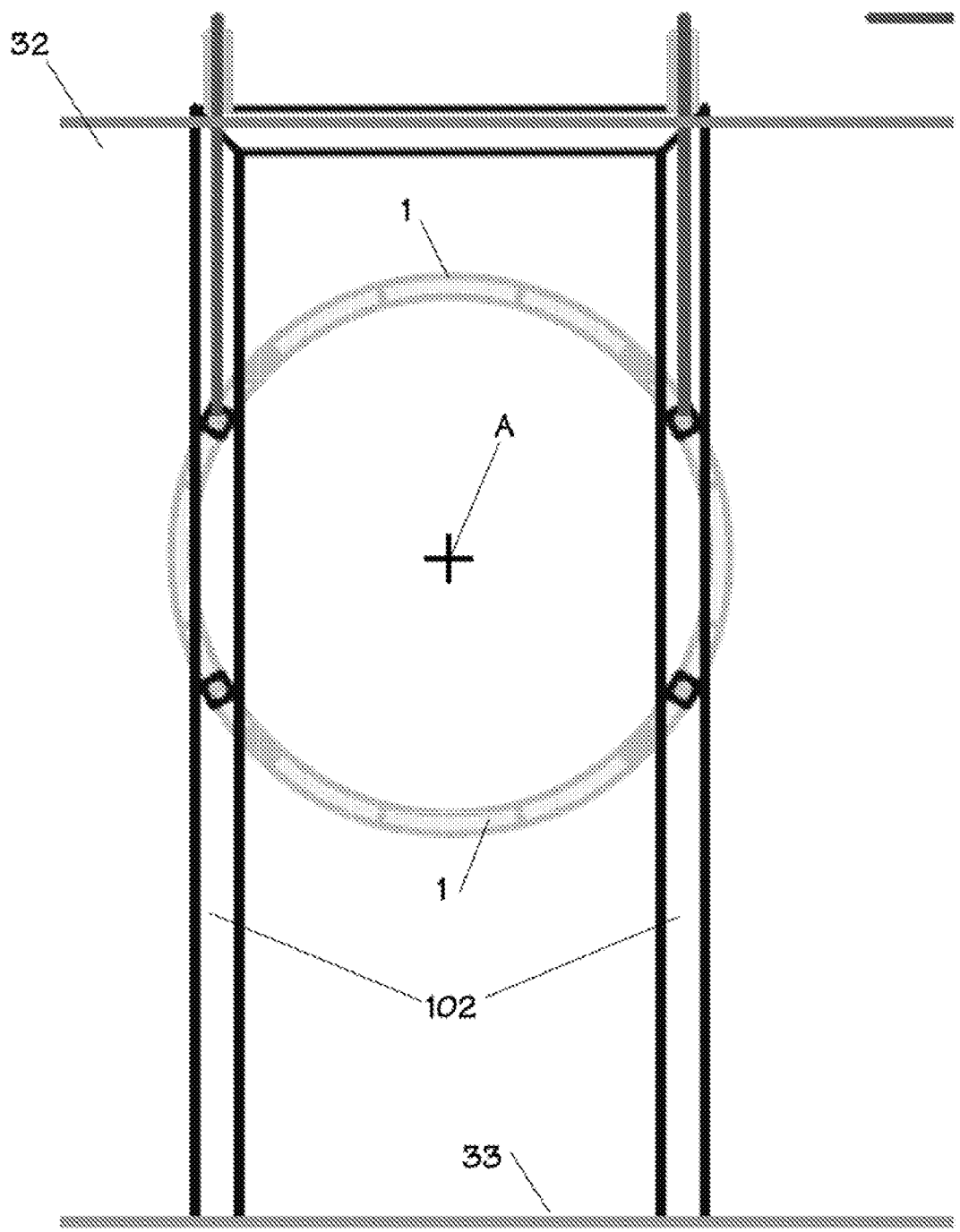
FIG. 22 is a plan view of the System when the System is attached to the bed underlying a body of water and uses a slide for being raised and lowered.
Figure 23:
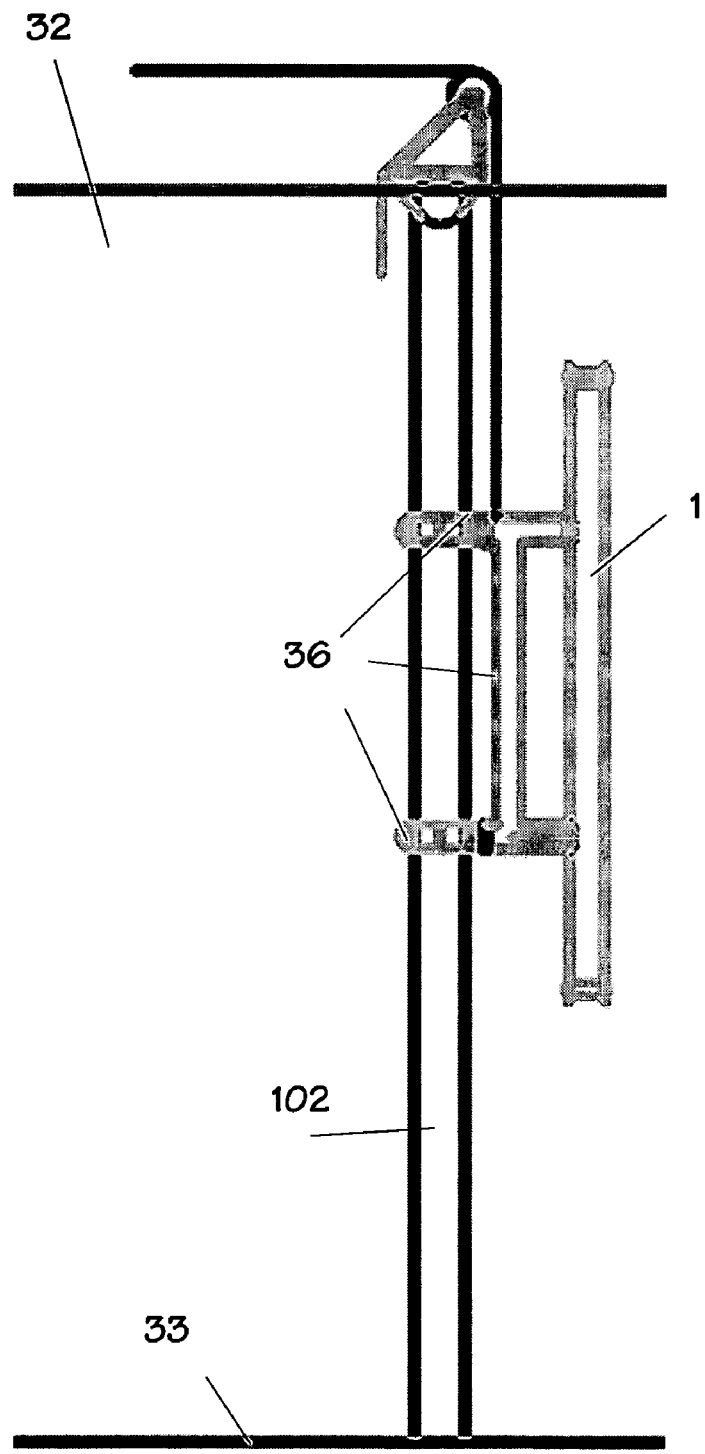
FIG. 23 is a lateral view of the embodiment of FIG. 22 with the System in a lowered, operational position.

Still further options for the generation of electricity by the System include connecting, e.g., with spokes 101, as illustrated in FIG. 18, the spacing ring 13 or one or more trolleys 2 to a central shaft 22 which drives a traditional generator 23; when wheels 4 are employed, having a small generator 24 powered by one or more wheels 4, as shown in FIG. 19 (Of course, this option would require specialized electrical connectors such as those discussed above and shown in FIG. 17.); having, as portrayed in FIG. 20, a toothed wheel 25, preferably having substantially the same shape and size as the spacing ring 13, which is attached to each trolley 2 and drives one or more toothed projections 26 around the perimeter 27 of a drive shaft 28, each of which drive shafts 28 operates a traditional generator 23; and, as portrayed in FIG. 21 for a System located within a canal 29, replacing the traditional generator 23 in the first and third technologies of this sentence with a hydraulic pump 30 that sends pressurized fluid through one or more lines 31 to drive a remote traditional generator 23. (In FIGS. 21 through 40 the blades 11 have not been shown in order to enhance the clarity of the features being discussed in those figures.)

If the track 1 follows a circular path, the spacing ring 13 and the electrical ring 15 merely need be circular. Should the track have a non-circular path, the spacing ring 13 and the electrical ring 15 (at least when it is a complete ring) must each be hinged.

Figure 33:
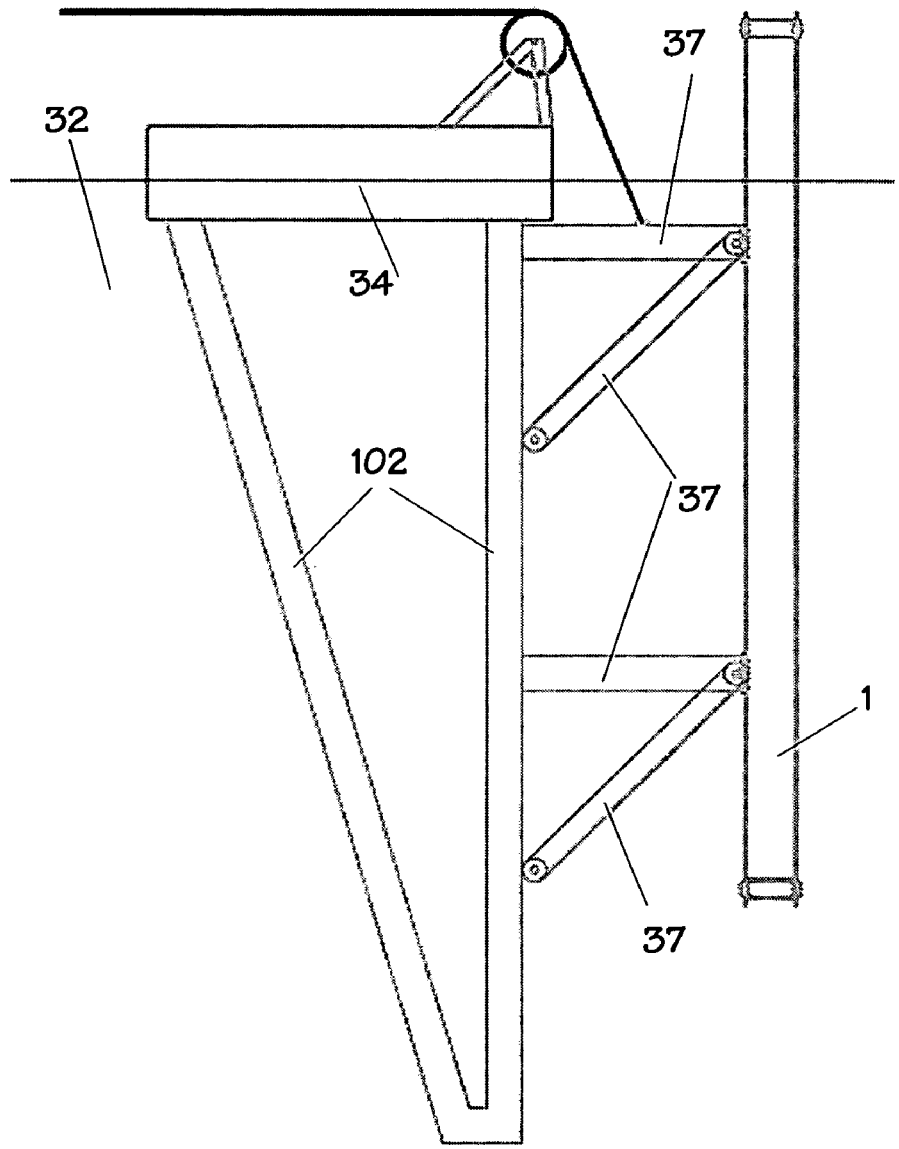
FIG. 33 is a lateral view of the embodiment of FIG. 31 with the System is a raised position.
Figure 34:
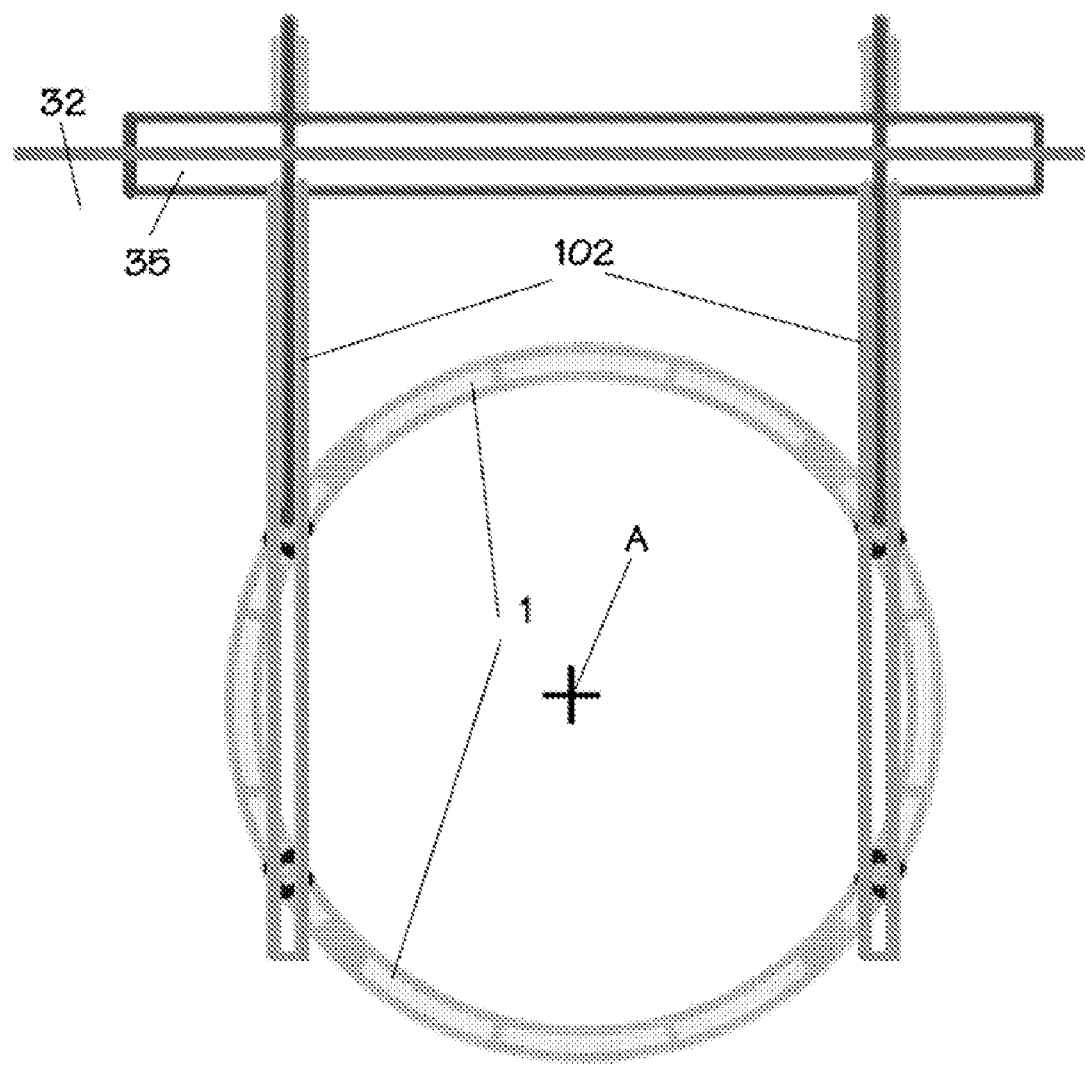
FIG. 34 is a plan view of the System when the System is attached to a ship and uses a slide for being raised and lowered.
Figure 35:
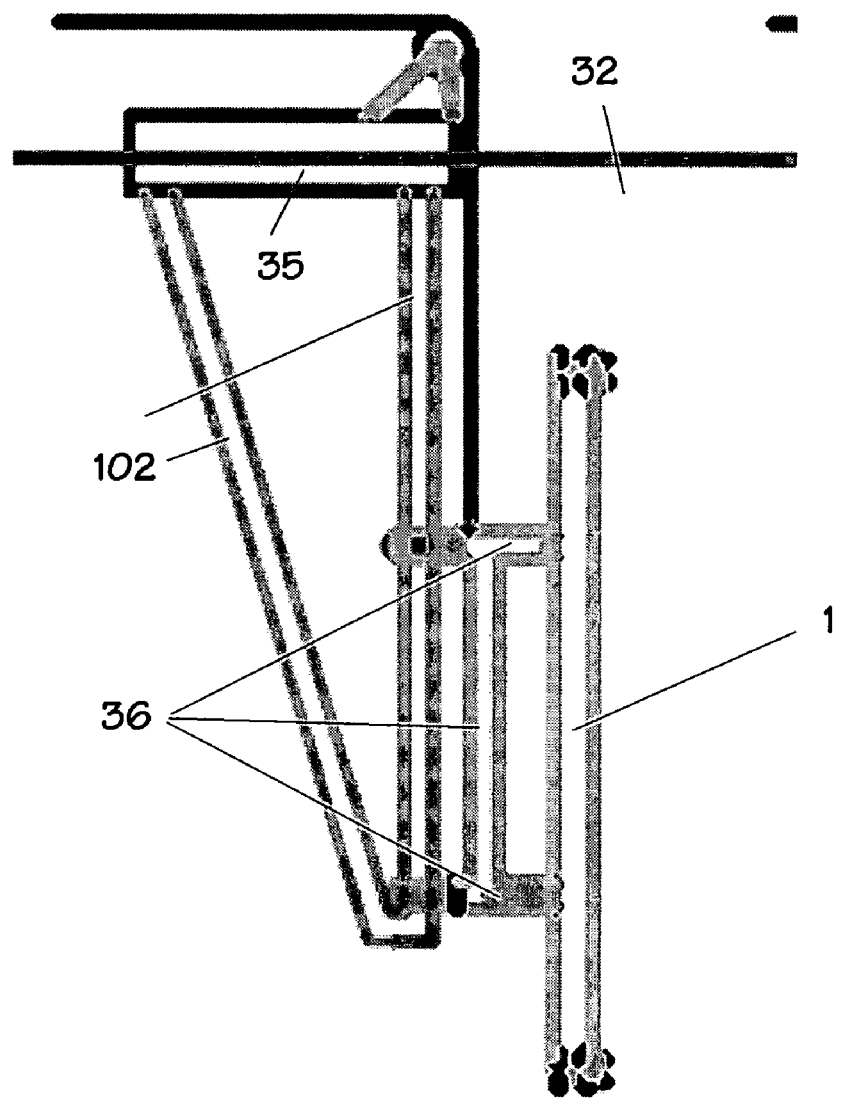
FIG. 35 is a lateral view of the embodiment of FIG. 34 with the System in a lowered, operational position.
Figure 36:
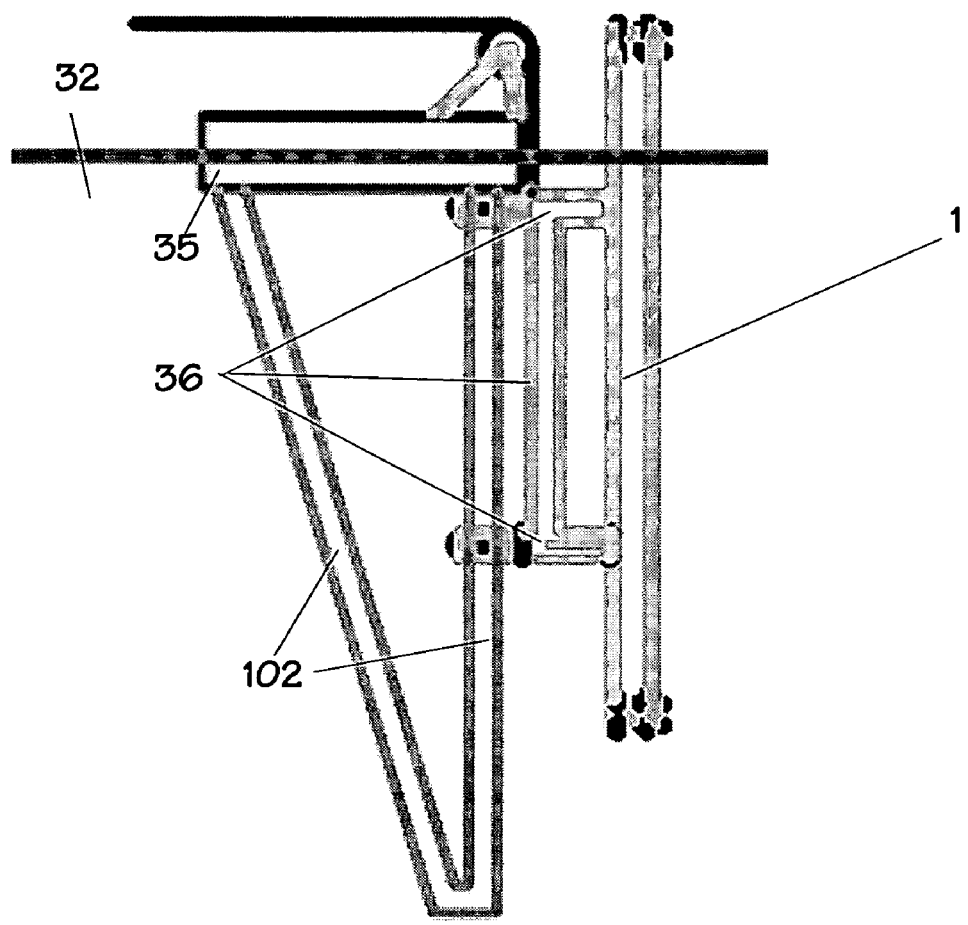
FIG. 36 is a lateral view of the embodiment of FIG. 34 with the System is a raised position.

If placed in the ocean or another large body of water 32, the System can be attached, e.g., with columns 102, to the bed 33 underlying the body of water 32, as depicted in FIGS. 22 through 27; to a floating object such as a barge 34, as portrayed in FIGS. 28 through 33; or to a powered ship 35, as illustrated in FIGS. 34 through 36. (In the case of the powered ship 35 the current driving the System would be that which is artificially generated by the movement of the ship through the water.) If placed in a river or other moving body of water, the System can be attached to the bed underlying the body of water; the System can be attached to a floating object, such as a barge; or the System can be attached to the shore, so long as only some or all of the portions of the system that need not be in contact with the flowing fluid, i.e., in this case, the water, are outside the flow of the water.

Moreover, although the preferred orientation of the track 1 is within a substantially vertical plane, it can be operated in any orientation.

Figure 37:
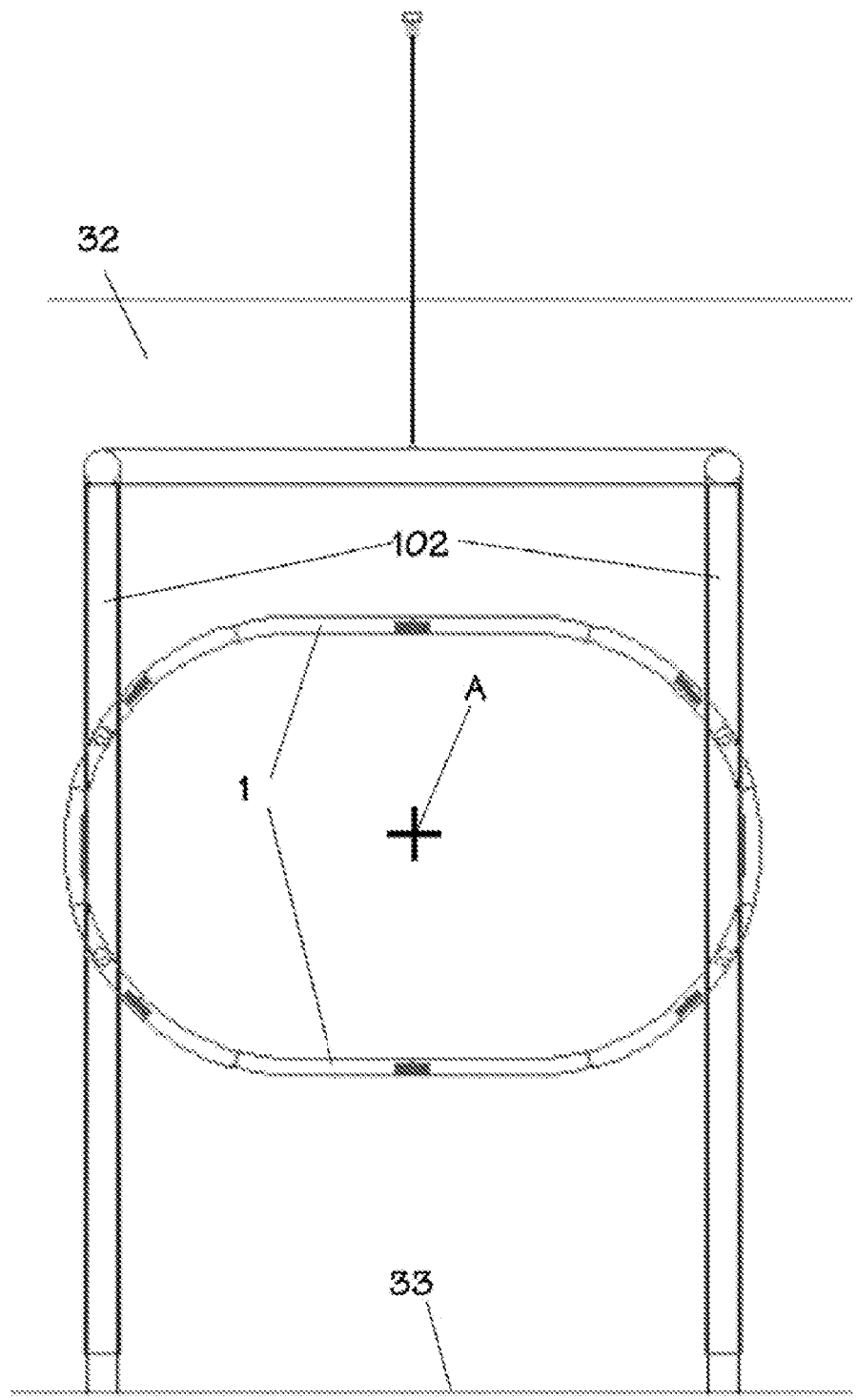
FIG. 37 is plan view of a System with an oval track supported by two columns, each of which columns is slidably mounted on a column fastened to the floor of a body of water.
Figure 38:
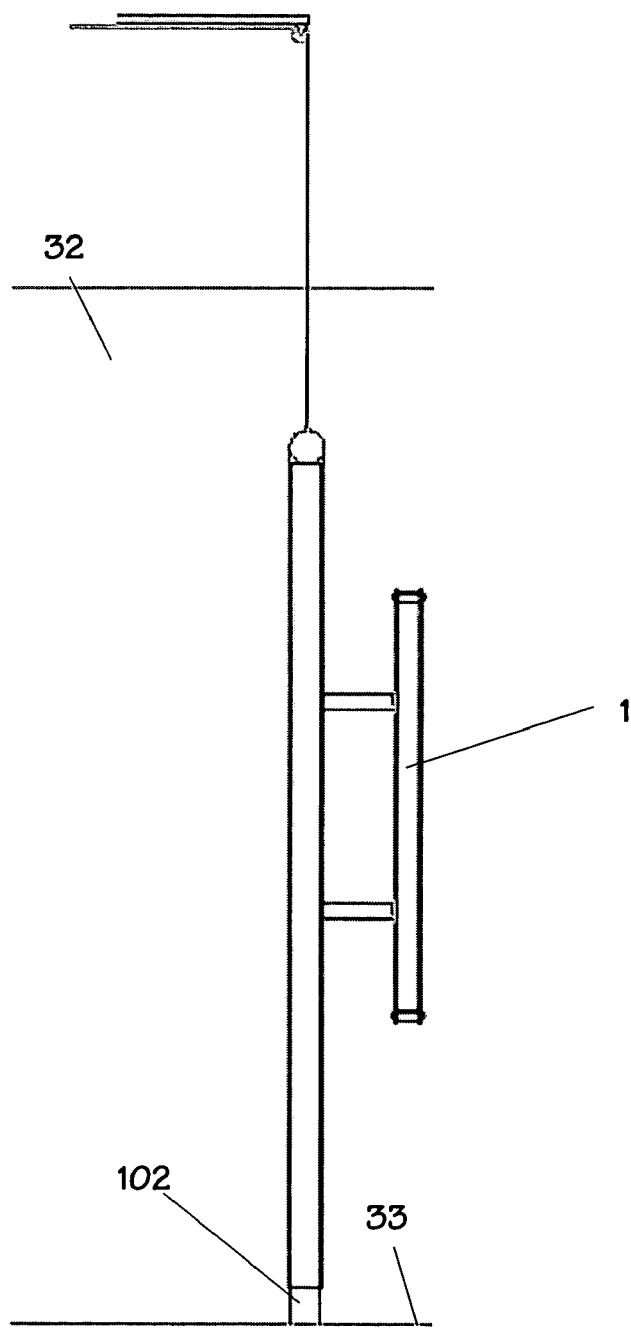
FIG. 38 is a lateral view of the embodiment of FIG. 37 in a lowered, operational position.
Figure 39:
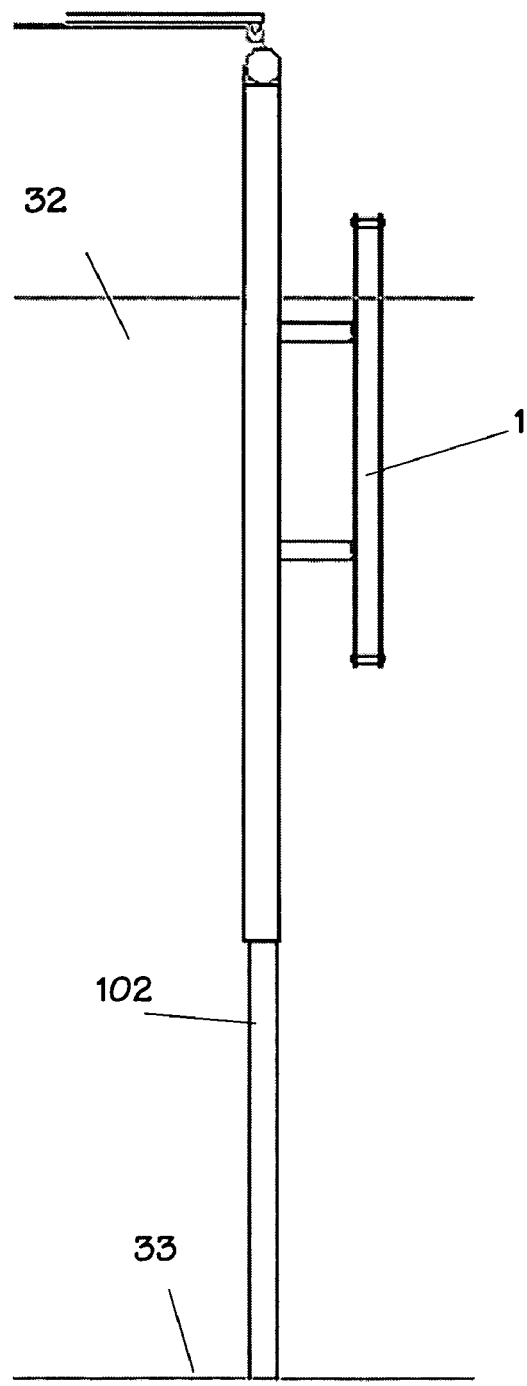
FIG. 39 is a lateral view of the embodiment of FIG. 37 in a raised position.

And a non-circular shape for the track 1 attached, e.g., with columns 102, to the bed 33 of a body of water 32 is portrayed in FIGS. 37 through 39.

Figure 24:
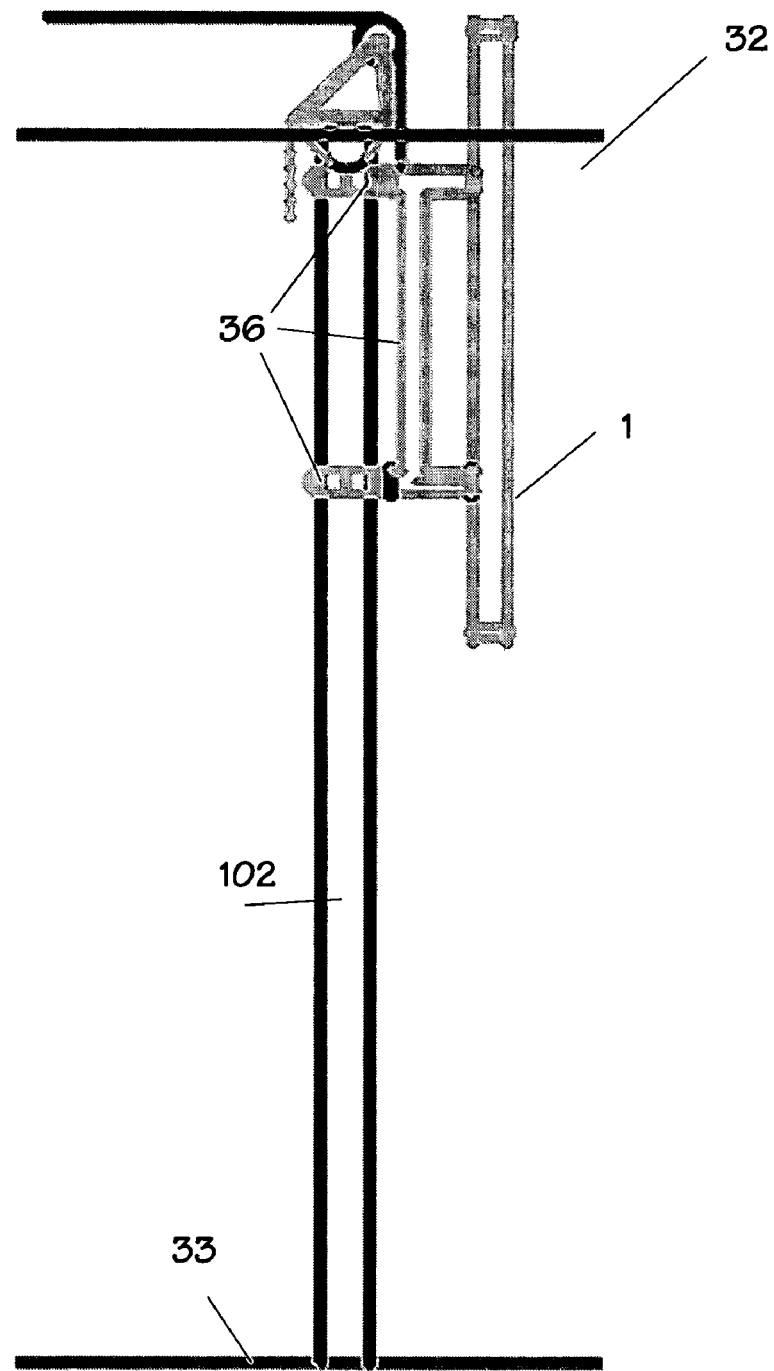
FIG. 24 is a lateral view of the embodiment of FIG. 22 with the System is a raised position.
Figure 25:
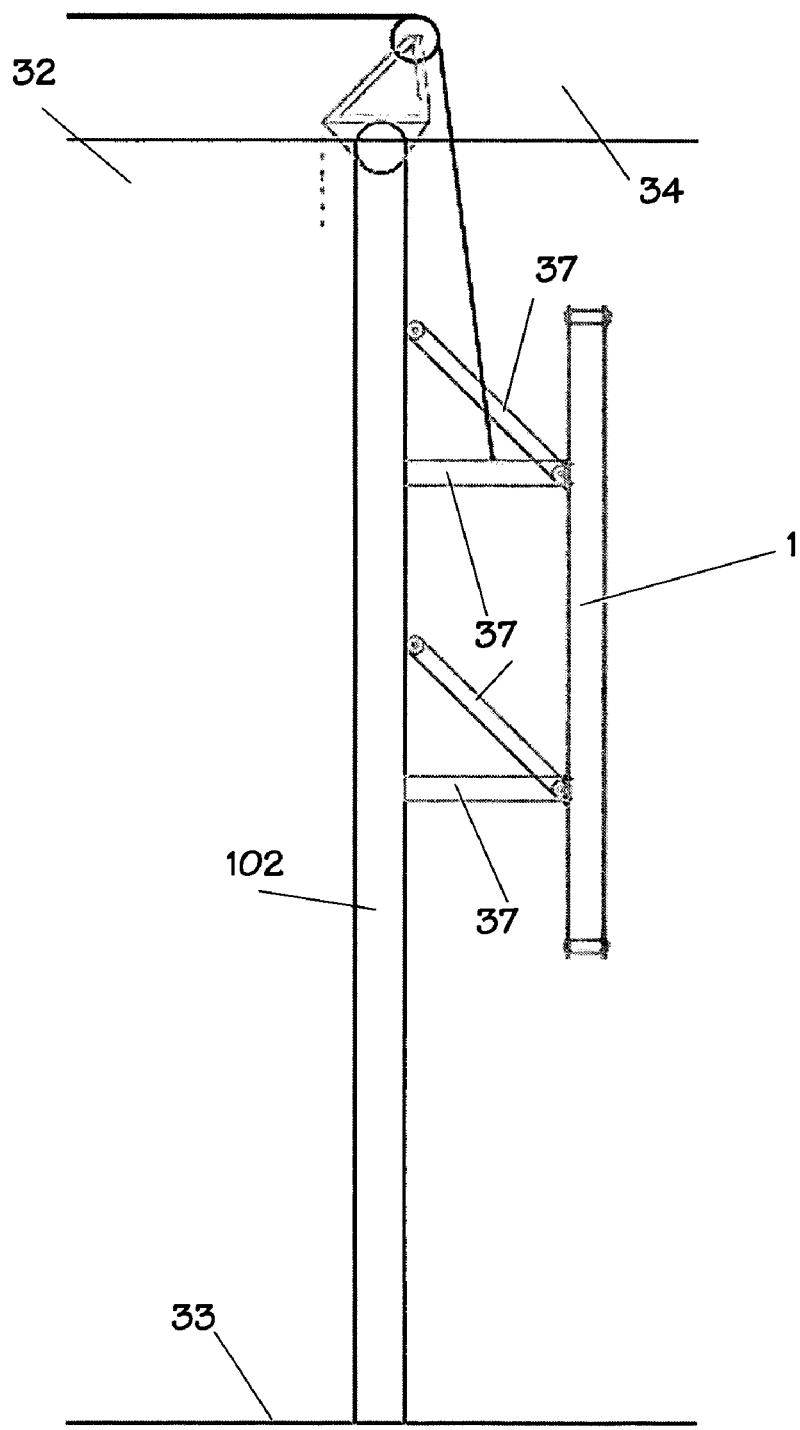
FIG. 25 is a plan view of the System when the System is attached to the bed underlying a body of water and utilizes pivoting linkages for being raised and lowered.
Figure 26:
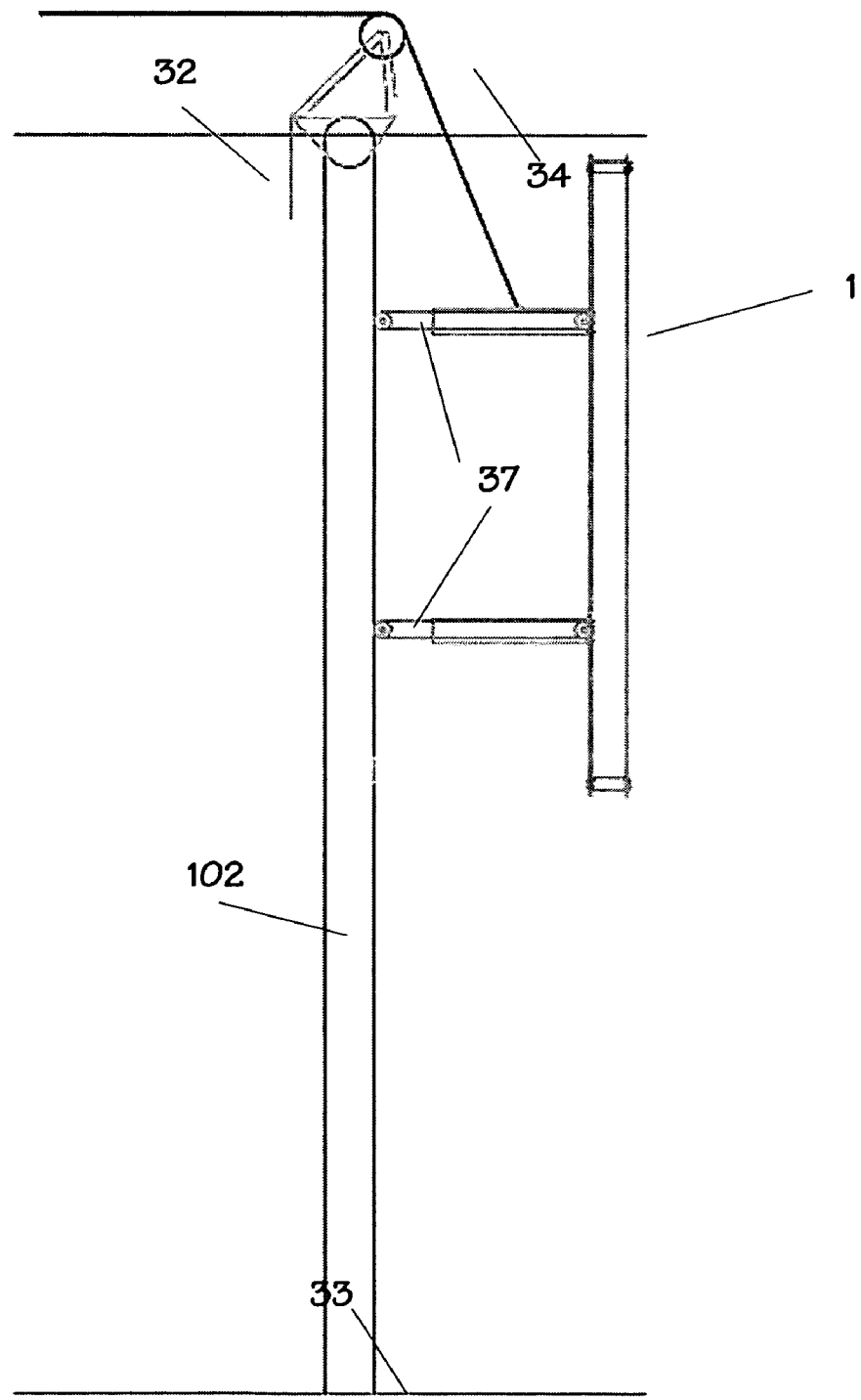
FIG. 26 is a lateral view of the embodiment of FIG. 25 with the System in a lowered, operational position.
Figure 27:
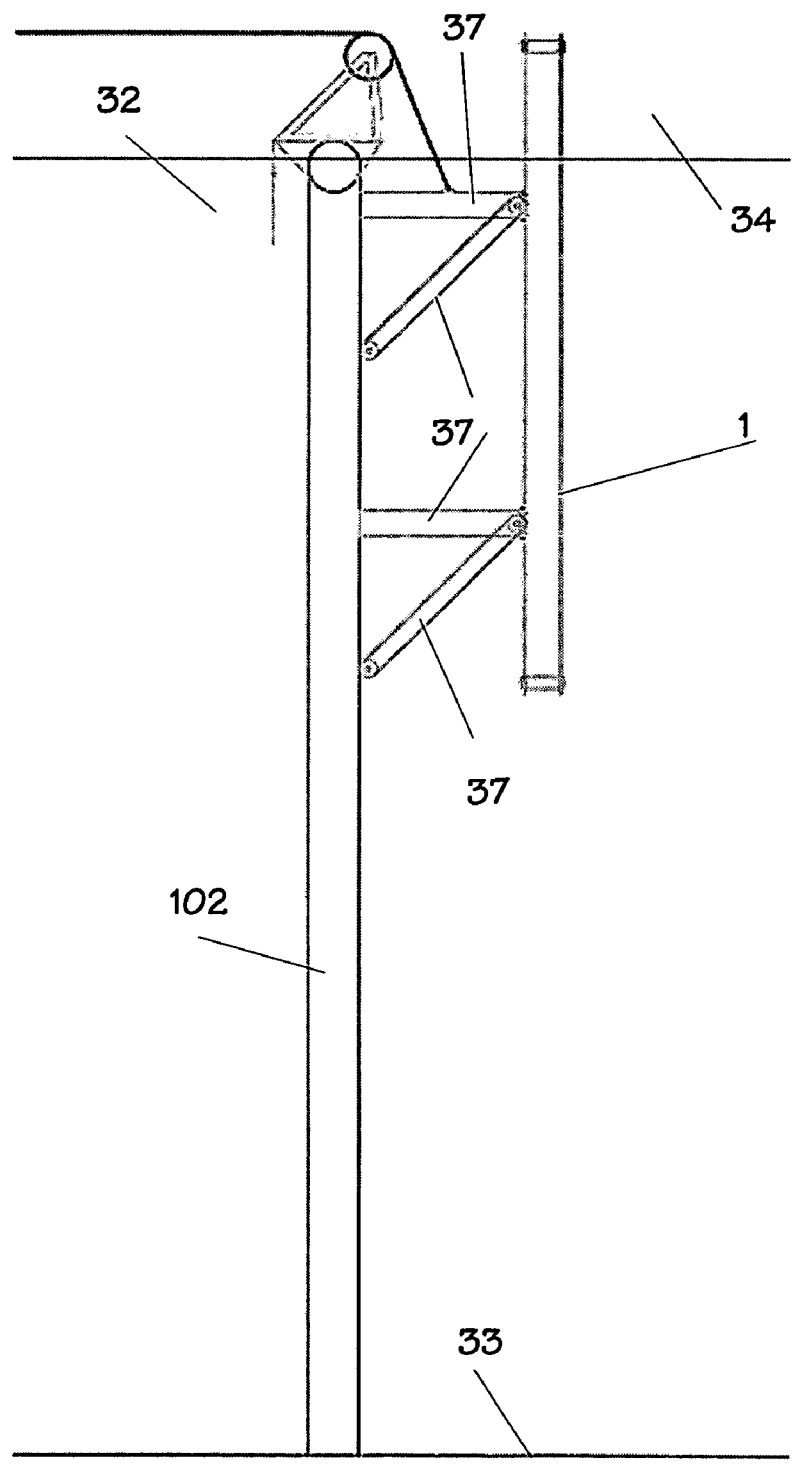
FIG. 27 is a lateral view of the embodiment of FIG. 25 with the System is a raised position.
Figure 28:
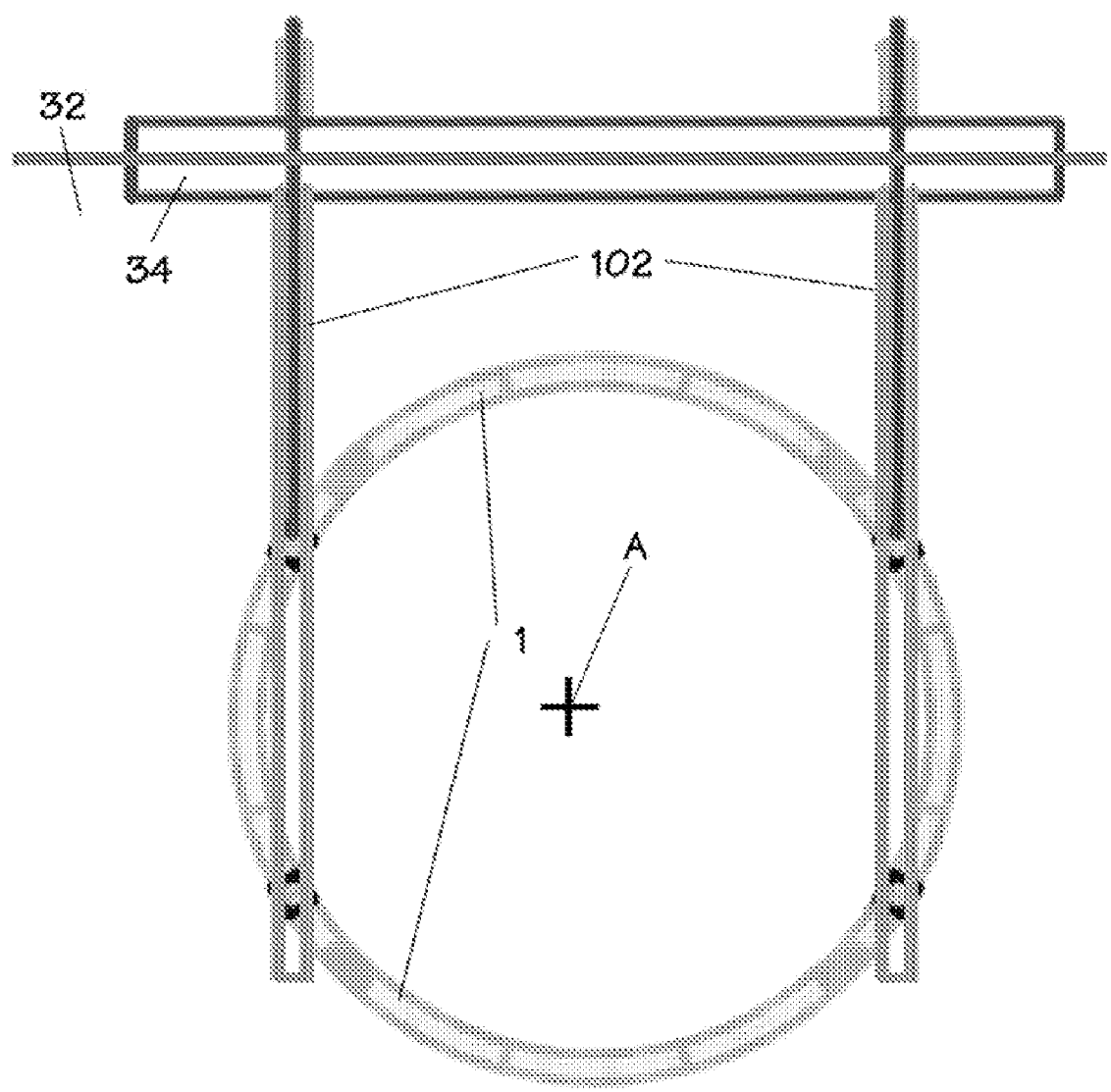
FIG. 28 is a plan view of the System when the System is attached to a barge and uses a slide for being raised and lowered.
Figure 29:
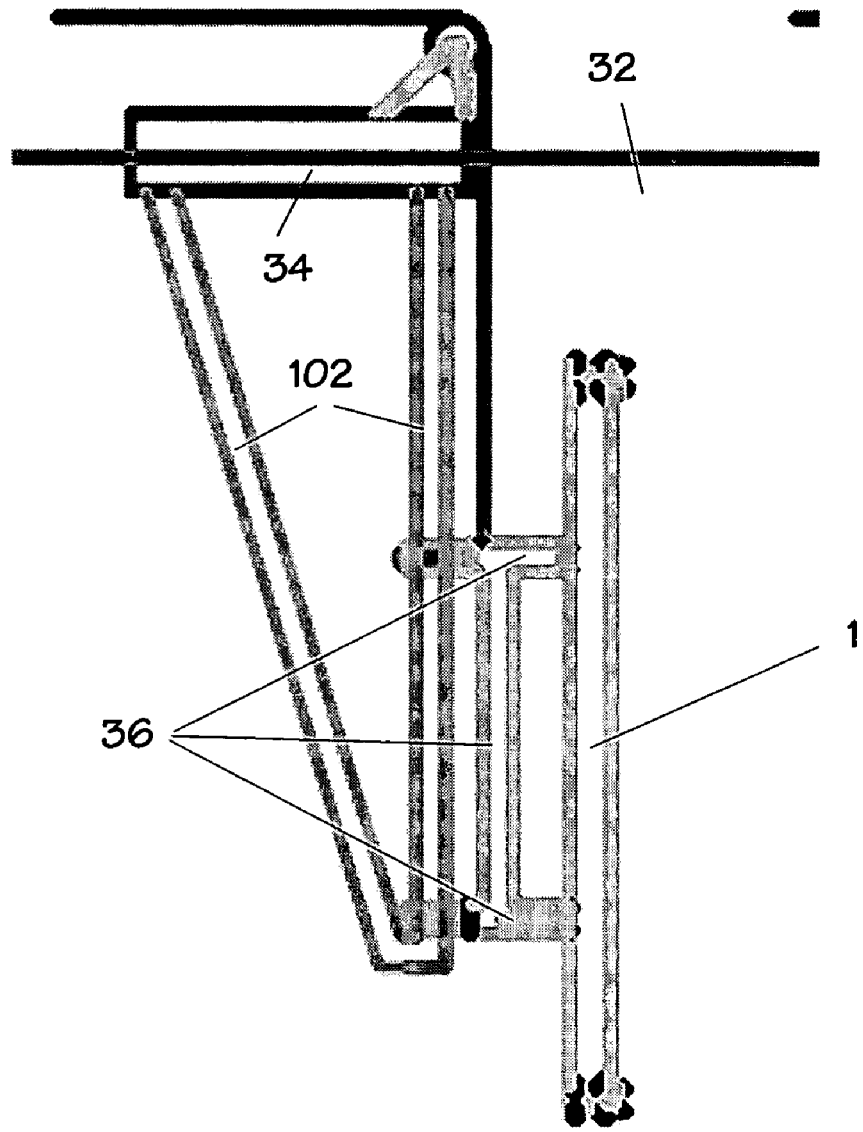
FIG. 29 is a lateral view of the embodiment of FIG. 28 with the System in a lowered, operational position.
Figure 30:
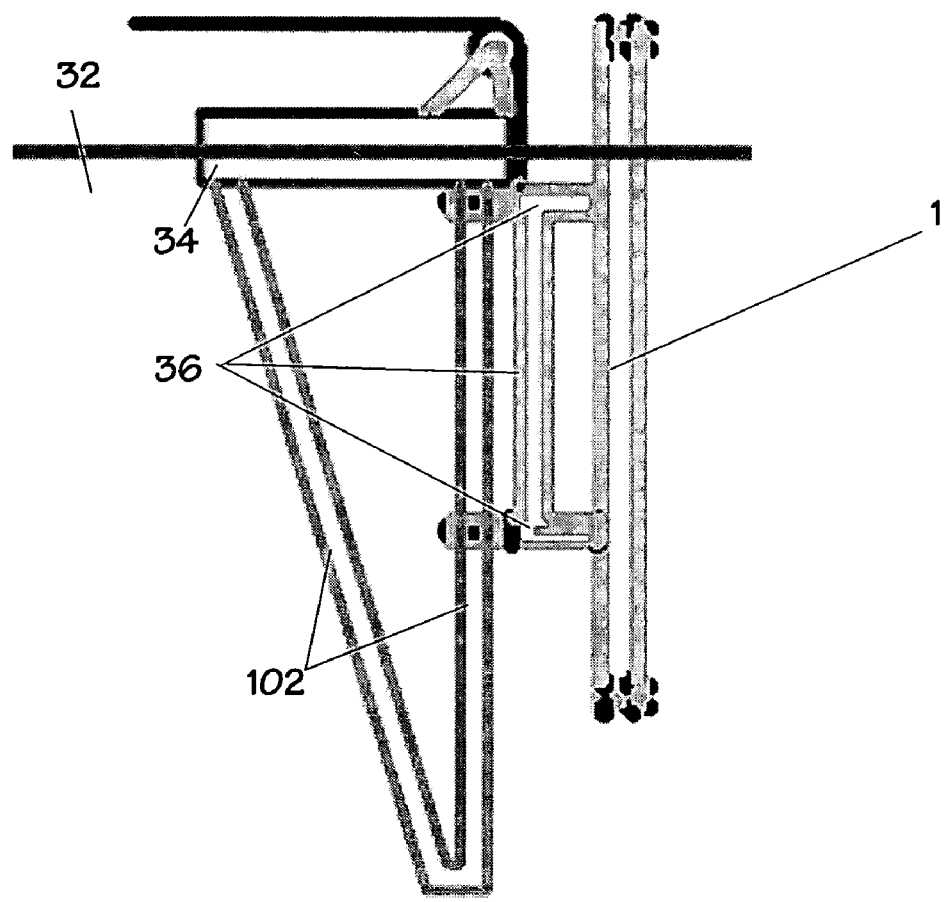
FIG. 30 is a lateral view of the embodiment of FIG. 28 with the System is a raised position.
Figure 31:
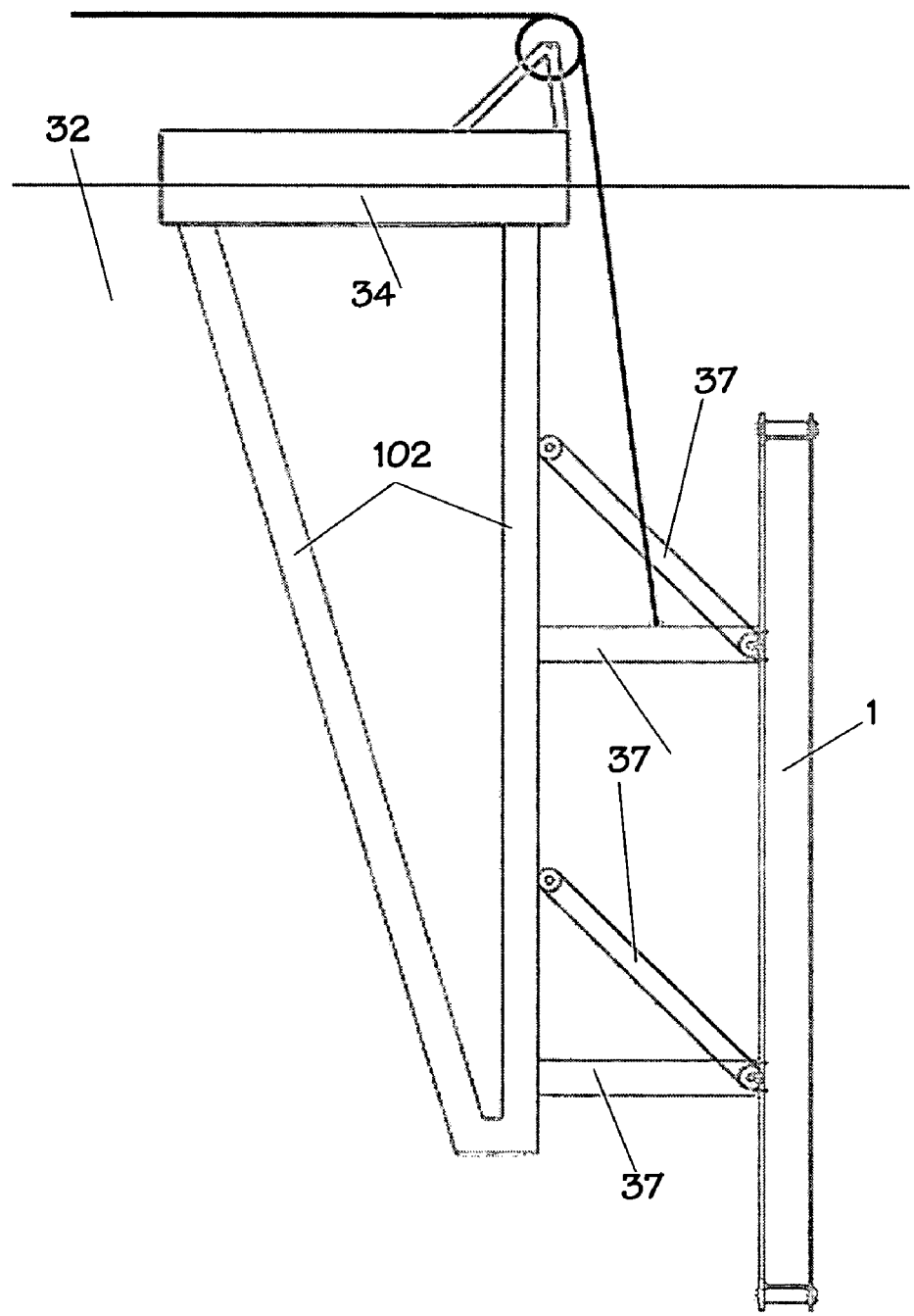
FIG. 31 is a plan view of the System when the System is attached to a barge and utilizes pivoting linkages for being raised and lowered.
Figure 32:
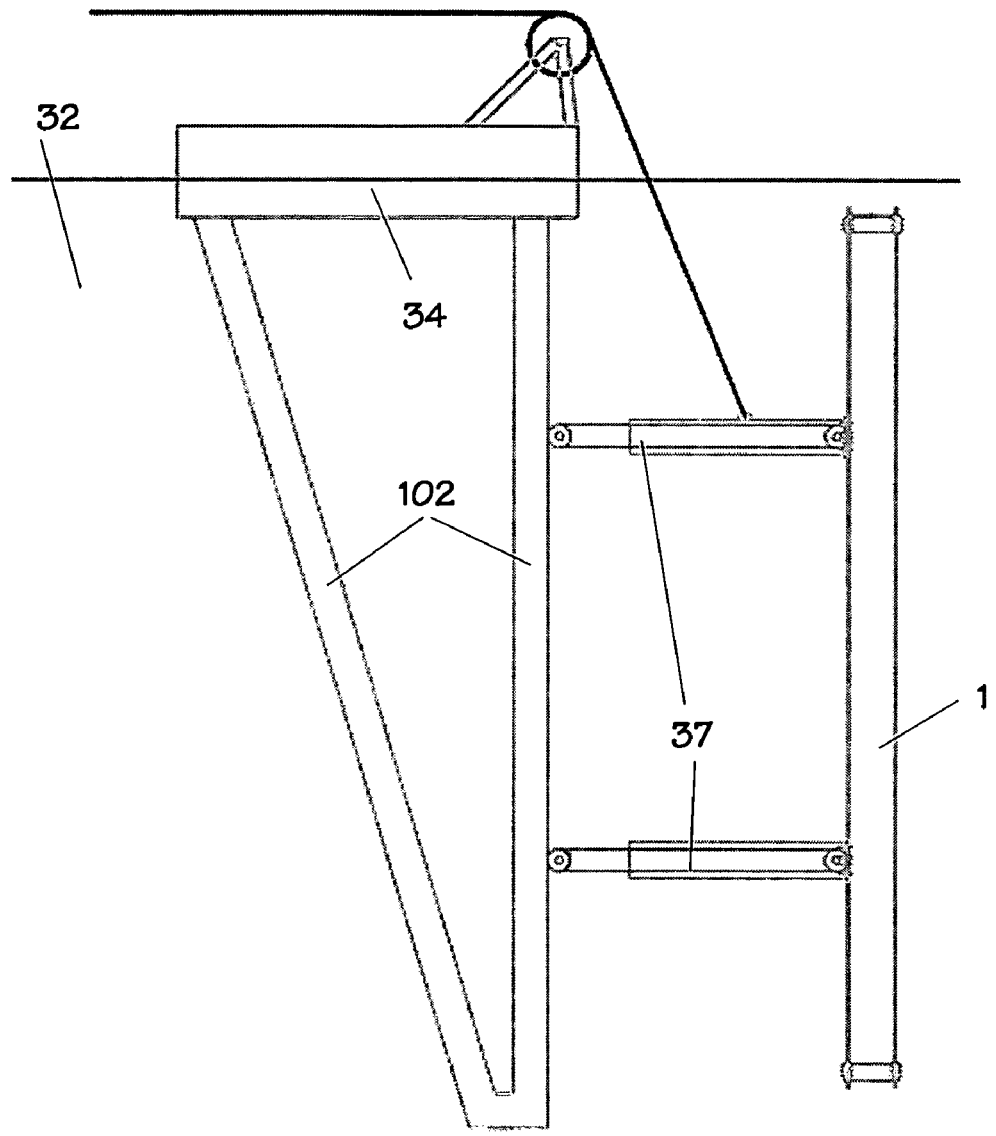
FIG. 32 is a lateral view of the embodiment of FIG. 31 with the System in a lowered, operational position.

Since it is beneficial to be able to raise the System for maintenance or, sometimes, for movement of the barge 34 or ship 35, FIGS. 24, 30, and 36 shows the System raised through the use of a slide 36 whereas FIGS. 27 and 33 portray the System raised through the use of pivoting linkages 37.

Figure 40:
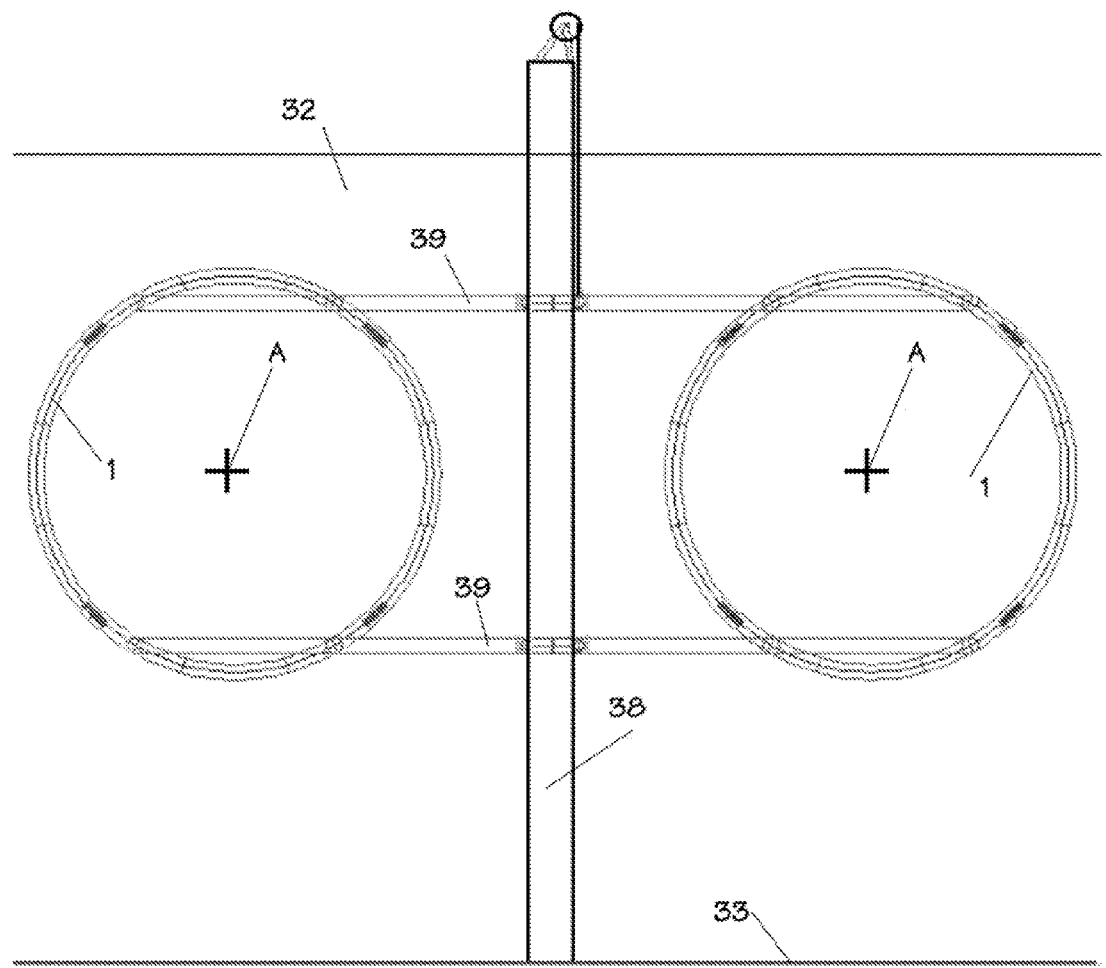
FIG. 40 shows a single support column utilizing two horizontal beams to support two separate Systems.

Finally, the possibility of utilizing a single support column 38 and a single horizontal beam 39 or multiple (preferably, two) horizontal beams 39 to support multiple Systems is illustrated in FIG. 40.

As used herein, the term "substantially" indicates that one skilled in the art would consider the value modified by such terms to be within acceptable limits for the stated value. Also as used herein the term "preferable" or "preferably" means that a specified element or technique is more acceptable than another but not that such specified element or technique is a necessity.

We claim:

1. A system for generating electricity from fluid currents, the system comprising:
    a closed-loop track;
    at least one trolley;
    at least one blade attached to the at least one trolley;
    a means for supporting and guiding movement of the at least one trolley along said closed-loop track, the at least one trolley generally rotating about an axis of the closed-loop track and substantially within a plane during movement along the closed-loop track; and
    a means for converting motion of the at least one trolley into electrical energy,
    wherein the at least one blade extends in a direction radially outward relative to the closed-loop track and is configured to interact with fluid currents moving in a direction approximately parallel to the axis of the closed-loop track about which the at least one trolley rotates to cause movement of the at least one trolley, and
    wherein at least a portion of the at least one blade intersects the plane in which the at least one trolley rotates during movement of the at least one trolley along the closed-loop track.

2. The system for generating electricity from fluid currents as recited in claim 1, wherein the at least one trolley comprises a plurality of trolleys and the system further comprises a spacing ring for maintaining spacing of each of said trolleys.

3. The system for generating electricity from fluid currents as recited in claim 2, further comprising;
    one or more additional blades attached to said spacing ring.

4. The system for generating electricity from fluid currents as recited in claim 2, wherein:
    the means for supporting and guiding is chosen from one of wheels, magnetic levitation technology, or a combination thereof.

5. The system for generating electricity from fluid currents as recited in claim 4, wherein:
    the means for converting comprises an electrical ring, attached to each trolley and said electrical ring containing magnets; and
    a conductor connected to said track in such a location that said conductor is at least sometimes within the magnetic field of the magnets.

6. The system for generating electricity from fluid currents as recited in claim 4, wherein:
    the means for converting comprises an annular non-conducting unit, said annular non-conducting unit being attached to said track and said annular non-conducting unit containing magnets; and
    an electrical ring wherein said electrical ring is a conductor in such a location that said electrical ring is at least sometimes within the magnetic field of the magnets.

7. The system for generating electricity from fluid currents as recited in claim 4, wherein:
    the means for converting comprises a central shaft;
    at least one spoke attaching said central shaft to at least one of said trolleys; and
    a generator driven by said central shaft.

8. The system for generating electricity from fluid currents as recited in claim 4, wherein:
    the means for supporting and guiding comprises one of wheels or a combination of magnetic levitation technology and wheels, and the means for converting comprises at least one small generator powered by at least one of said wheels.

9. The system for generating electricity from fluid currents as recited in claim 4, wherein:
    the means for converting comprises a toothed wheel attached to each said trolley;
    a drive shaft having a perimeter and one or more toothed projections around such perimeter such that said drive shaft is driven by said toothed wheel; and
    for each said drive shaft, a generator operated by said drive shaft.

10. The system for generating electricity from fluid currents as recited in claim 4, wherein:
    the means for converting comprises a central shaft;
    at least one spoke attaching said central shaft to at least one of said trolleys;
    at least one line;
    a hydraulic pump driven by said central shaft for pumping pressurized fluid through said at least one line; and
    a generator driven by the pumping.

11. The system for generating electricity from fluid currents as recited in claim 4, wherein:
    the means for converting comprises a toothed wheel attached to each said trolley;
    a drive shaft having a perimeter and one or more toothed projections around such perimeter such that said drive shaft is driven by said toothed wheel;
    a hydraulic pump operated by said drive shaft for pumping pressurized fluid through at least one line; and
    a generator driven by the pumping.

12. The system for generating electricity from fluid currents as recited in claim 4, further comprising:
    one or more additional blades attached to said spacing ring.

13. The system for generating electricity from fluid currents as recited in claim 2, wherein:
    the means for converting comprises an electrical ring, attached to each trolley and said electrical ring containing magnets; and
    a conductor connected to said track in such a location that said conductor is at least sometimes within the magnetic field o the magnets.

14. The system for generating electricity from fluid currents as recited in claim 2, wherein:
    the means for converting comprises an annular non-conducting unit, said annular non-conducting unit being attached to said track and said annular non-conducting unit containing magnets; and
    an electrical ring wherein said electrical ring is a conductor in such a location that said electrical ring is at least sometimes within the magnetic field of the magnets.

15. The system for generating electricity from fluid currents as recited in claim 2, wherein:
    the means for converting comprises a central shaft;
    at least one spoke attaching said central shaft to at least one of said trolleys; and
    a generator driven by said central shaft.

16. The system for generating electricity from fluid currents as recited in claim 2, wherein:

the means for supporting and guiding comprises one of wheels or a combination of magnetic levitation technology and wheels, and the means for converting comprises at least one small generator powered by at least one of said wheels.

17. The system for generating electricity from fluid currents as recited in claim 2, wherein:
the means for converting comprises a toothed wheel attached to each said trolley;
a drive shaft having a perimeter and one or more toothed projections around such perimeter such that said drive shaft is driven by said toothed wheel; and
for each said drive shaft, a generator operated by said drive shaft.

18. The system for generating electricity from fluid currents as recited in claim 2, wherein:
the means for converting comprises a central shaft;
at least one spoke attaching said central shaft to at least one of said trolleys;
at least one line;
a hydraulic pump driven by said central shaft for pumping pressurized fluid through said at least one line; and
a generator driven by the pumping.

19. The system for generating electricity from fluid currents as recited in claim 2, wherein:
the means for converting comprises a toothed wheel attached to each said trolley;
a drive shaft having a perimeter and one or more toothed projections around such perimeter such that said drive shaft is driven by said toothed wheel;
a hydraulic pump operated by each drive shaft for pumping pressurized fluid through at least one line; and
a generator driven by the pumping.

20. The system for generating electricity from fluid currents as recited in claim 1, wherein:
the means for supporting and guiding is chosen from one of wheels, magnetic levitation technology, or a combination thereof.

21. The system for generating electricity from fluid currents as recited in claim 20, wherein:
the means for converting comprises an electrical ring attached to the at least one trolley and said electrical ring containing magnets; and
a conductor connected to said track in such a location that said conductor is at least sometimes within the magnetic field o the magnets.

22. The system for generating electricity from fluid currents as recited in claim 20, wherein:
the means for converting comprises an annular non-conducting unit, said annular non-conducting unit being attached to said track and said annular non-conducting unit containing magnets; and
an electrical ring wherein said electrical ring is a conductor in such a location that said electrical ring is at least sometimes within the magnetic field of the magnets.

23. The system for generating electricity from fluid currents as recited in claim 20, wherein:
the means for converting comprises a central shaft;
at least one spoke attaching said central shaft to the at least one trolley; and
a generator driven by said central shaft.

24. The system for generating electricity from fluid currents as recited in claim 20, wherein:
the means for supporting and guiding comprises one of wheels or a combination of magnetic levitation technology and wheels, and the means for converting comprises at least one small generator powered by at least one of said wheels.

25. The system for generating electricity from fluid currents as recited in claim 20, wherein:
the means for converting comprises a toothed wheel attached to the at least one trolley;
a drive shaft having a perimeter and one or more toothed projections around such perimeter such that said drive shaft is driven by said toothed wheel; and
a generator operated by said drive shaft.

26. The system for generating electricity from fluid currents as recited in claim 20, wherein:
the means for converting comprises a central shaft;
at least one spoke attaching said central shaft to the at least one trolley;
at least one line;
a hydraulic pump driven by said central shaft for pumping pressurized fluid through said at least one line; and
a generator driven by the pumping.

27. The system for generating electricity from fluid currents as recited in claim 20, wherein:
the means for converting comprises a toothed wheel attached to the at least one trolley;
a drive shaft having a perimeter and one or more toothed projections around such perimeter such that said drive shaft is driven by said toothed wheel;
a hydraulic pump for pumping pressurized fluid through at least one line; and
a generator driven by the pumping.

28. The system for generating electricity from fluid currents as recited in claim 1, wherein:
the means for converting comprises an electrical ring attached to the at least one trolley and said electrical ring containing magnets; and
a conductor connected to said track in such a location that said conductor is at least sometimes within the magnetic field of the magnets.

29. The system for generating electricity from fluid currents as recited in claim 1, wherein:
the means for converting comprises an annular non-conducting unit said annular non-conducting unit being attached to said track and said annular non-conducting unit containing magnets; and
an electrical ring wherein said electrical ring is a conductor in such a location that said electrical ring is at least sometimes within the magnetic field of the magnets.

30. The system for generating electricity from fluid currents as recited in claim 1, wherein:
the means for converting comprises a central shaft;
at least one spoke attaching said central shaft to the at least one trolley; and
a generator driven by said central shaft.

31. The system for generating electricity from fluid currents as recited in claim 1, wherein:
the means for supporting and guiding comprises one of wheels or a combination of magnetic levitation technology and wheels, and the means for converting comprises at least one small generator powered by at least one of said wheels.

32. The system for generating electricity from fluid currents as recited in claim 1, wherein:
the means for converting comprises a toothed wheel attached to the at least one trolley;
a drive shaft having a perimeter and one or more toothed projections around such perimeter such that said drive shaft is driven by said toothed wheel; and for each said drive shaft, a generator operated by said drive shaft.

33. The system for generating electricity from fluid currents as recited in claim 1, wherein:
the means for converting comprises a central shaft;
at least one spoke attaching said central shaft to the at least one trolley;
at least one line;
a hydraulic pump driven by said central shaft for pumping pressurized fluid through said at least one line; and
a generator driven by the pumping.

34. The system for generating electricity from fluid currents as recited in claim 1, wherein:
the means for converting comprises a toothed wheel attached to the at least one trolley;
a drive shaft having a perimeter and one or more toothed projections around such perimeter such that said drive shaft is driven by said toothed wheel;
a hydraulic for pumping pressurized fluid through at least one line; and
a generator driven by the pumping.

35. The system for generating electricity from fluid currents as recited in claim 1, wherein the at least one trolley comprises a plurality of trolleys and the system further comprises a means for maintaining space between consecutive trolleys.

36. The system for generating electricity from fluid currents as recited in claim 1, wherein the system is configured to be placed in liquid and interact with liquid currents to generate electricity.

37. A system for generating electricity from fluid currents, the system comprising:
a closed-loop track;
at least one trolley;
at least one blade attached to the at least one trolley,
wherein the at least one trolley is configured to move along the closed-loop track so as to generally rotate about an axis of the closed-loop track, wherein movement of the at least one trolley along the closed-loop track is converted to electrical energy,
wherein the at least one blade extends in a direction radially outward relative to the closed-loop track and is configured to interact with fluid currents moving in a direction approximately parallel to the axis of the closed-loop track about which the at least one trolley rotates to cause movement of the at least one trolley, and
wherein at least a portion of the blade intersects a plane in which the at least one trolley rotates during movement along the closed-loop track.

38. The system of claim 37, further comprising one of wheels, magnetic levitation technology, or a combination thereof configured to guide the movement of the at least one trolley along the closed-loop track.

39. The system of claim 37, further comprising:
a magnet and a conductor configured to move relative to each other to generate electricity during movement of the at least one trolley along the closed-loop track.

40. The system of claim 37, wherein one of the magnet and the conductor is configured to move with the at least one trolley and the other of the magnet and the conductor remains in a fixed position during movement of the at least one trolley.

41. The system of claim 37, further comprising:
one of a non-conductive unit and a conductor configured to move with the at least one trolley along at least a portion of the closed-loop track; and
the other of the non-conductive unit and the conductor mounted to the closed-loop track,
wherein the non-conductive unit comprises magnets and the non-conductive unit and conductor are mounted such that the conductor is at least sometimes within the magnetic field of the magnets.

42. The system of claim 41, further comprising a connection mechanism for at least temporarily connecting the one of the non-conductive unit and the conductor to the at least one trolley so that the one of the non-conductive unit and the conductor moves with the at least one trolley along at least a portion of the track.

43. The system of claim 42, wherein the connection mechanism is chosen from brackets, flexible members, magnets, and stops.

44. The system of claim 41, wherein the non-conductive unit comprises an electrical ring containing magnets and is at least temporarily connected to the at least one trolley.

45. The system of claim 37, further comprising:
an annular non-conducting unit attached to said closed-loop track, said annular non-conducting unit containing magnets; and
an electrical ring, wherein said electrical ring is a conductor in such a location that said electrical ring is at least sometimes within the magnetic field of the magnets.

46. The system of claim 37, further comprising a spacing ring, the at least one trolley being connected to the spacing ring.

47. The system of claim 46, wherein the at least one trolley comprises a plurality of trolleys and the spacing ring is configured to maintain space between consecutive trolleys.

48. The system of claim 46, further comprising one or more additional blades attached to said spacing ring.

49. The system of claim 37, wherein the at least one trolley comprises a plurality of trolleys and the system further comprises a mechanism for maintaining space between the trolleys.

50. The system of claim 37, wherein the closed-loop track is one of circular and elliptical.

51. The system of claim 37, wherein an orientation of the at least one blade relative to the at least one trolley is fixed.

52. The system of claim 37, wherein an orientation of the at least one blade relative to the at least one trolley is adjustable.

53. The system of claim 37, further comprising at least one additional blade extending in a direction radially inward relative to the closed-loop track and configured to interact with fluid currents moving in a direction substantially parallel to the axis of the closed-loop track about which the at least one trolley rotates to cause movement of the at least one trolley.

54. The system of claim 53, wherein the at least one additional blade is attached to the at least one trolley.

55. The system of claim 54, wherein the at least one blade and the at least one additional blade are asymmetric about the closed-loop track.

56. The system of claim 53, wherein the at least one blade and the at least one additional blade have differing dimensions.

57. The system of claim 56, wherein the length of the at least one blade is greater than the length of the at least one additional blade.

58. The system of claim 37, wherein the system is configured to be placed in a liquid and interact with currents in the liquid to generate electricity.

59. The system of claim 58, wherein the system is configured to be mounted to a floating structure.

60. A method for generating electricity from fluid currents, the method comprising:
positioning in fluid, a system comprising a closed-loop track, at least one trolley configured to move along the closed-loop track so as to generally rotate about an axis of the closed-loop track, and at least one blade attached to the at least one trolley, the at least one blade extending radially outward relative to the track and having at least a portion that intersects a plane in which the at least one trolley rotates;

orienting the system such that fluid currents moving in a direction approximately parallel to the axis about which the at least one trolley rotates interact with the at least one blade to cause the at least one trolley to move along the closed-loop track; and converting movement of the at least one trolley along the closed-loop track to electrical energy.

61. The method of claim 60, wherein the positioning in fluid comprises positioning in a liquid.

62. The method of claim 60, wherein the system comprises a plurality of trolleys and the method further comprises maintaining space between consecutive trolleys along the closed-loop track.

63. The method of claim 60, further comprising guiding movement of the at least one trolley along the track via one of wheels, magnetic levitation technology or a combination thereof.

64. The method of claim 60, further comprising adjusting an orientation of the at least one blade relative to the at least one trolley.

65. The method of claim 60, wherein the positioning in the fluid comprises positioning in the fluid a system further comprising at least one additional blade extending radially inward relative to the closed-loop track.

66. The method of claim 60, wherein converting movement of the at least one trolley along the track to electrical energy comprises moving a magnet and at least one conductor relative to each other.

67. The method of claim 60, further comprising supporting the system via a floating structure.

* * * * *

UNITED STATES PATENT AND TRADEMARK OFFICE
CERTIFICATE OF CORRECTION

| | | |
|---|---|---|
| PATENT NO. | : 7,453,166 B2 | Page 1 of 1 |
| APPLICATION NO. | : 11/448640 | |
| DATED | : November 18, 2008 | |
| INVENTOR(S) | : Daniel E. Power, III et al. | |

It is certified that error appears in the above-identified patent and that said Letters Patent is hereby corrected as shown below:

Claim 13, column 8, line 49, please replace "o" with --of--; and

Claim 40, column 11, line 58, please replace "37" with --39--.

Signed and Sealed this

Sixth Day of January, 2009

JON W. DUDAS
*Director of the United States Patent and Trademark Office*